United States Patent
Shinosaki et al.

(10) Patent No.: US 9,286,452 B2
(45) Date of Patent: Mar. 15, 2016

(54) IMAGE PROCESSING APPARATUS, IMAGE PROCESSING SYSTEM, METHOD OF PERFORMING STATUS MONITORING TO CHECK IF AUTHENTICATION SERVER RECOVERS FROM DOWN STATUS, AND RECORDING MEDIUM

(71) Applicant: Konica Minolta, Inc., Chiyoda-ku, Tokyo (JP)

(72) Inventors: Yusuke Shinosaki, Toyokawa (JP); Shinichi Asai, Gamagori (JP); Takao Kurohata, Hino (JP); Kentaro Nagatani, Toyokawa (JP); Junichi Isamikawa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/260,623

(22) Filed: Apr. 24, 2014

(65) Prior Publication Data

US 2014/0325595 A1    Oct. 30, 2014

(30) Foreign Application Priority Data

Apr. 26, 2013 (JP) ................. 2013-094778

(51) Int. Cl.
*H04L 29/06* (2006.01)
*G06F 21/31* (2013.01)
(Continued)

(52) U.S. Cl.
CPC ............... *G06F 21/31* (2013.01); *G06F 21/34* (2013.01); *G06F 21/6218* (2013.01); *G06Q 50/00* (2013.01); *H04L 63/08* (2013.01); *G06F 2221/2115* (2013.01)

(58) Field of Classification Search
CPC ....................................... H04L 63/08
USPC ........................................... 726/28
See application file for complete search history.

(56) References Cited

U.S. PATENT DOCUMENTS 8,516,558 B2 * 8/2013 Crandell ............... 726/5
2009/0180141 A1 * 7/2009 Takaishi et al. ........... 358/1.15
(Continued)

FOREIGN PATENT DOCUMENTS

JP    2009-170994 A    7/2009
JP    2010-015537 A    1/2010
(Continued)

OTHER PUBLICATIONS

Mac Product Eye, Review & Release, Mac Fan, vol. 19, No. 5 (May 1, 2011): pp. 189. (Document for an example of a well-known technique), with Partial English translation (the article introducing "Blitz 2.0").
(Continued)

*Primary Examiner* — Longbit Chai
(74) *Attorney, Agent, or Firm* — Buchanan Ingersoll & Rooney PC

(57) ABSTRACT

An image processing apparatus comprises: a transmitter that transmits user information input by a user, to an authentication server; a receiver that receives an authentication result from the authentication server; a job execution portion that executes a job if the user is successfully identified as an authorized user; a register storage that stores accumulated information including information about the executed job; an information transfer portion that transfers the accumulated information to the authentication server; a detector that detects an event if the authentication server is down; a time settings portion that specifies either "at a predetermined time" or "when log-on is requested", as the time to check the status of the authentication server; and a status checking portion that: transmits acknowledgment request data to the authentication server at the specified time; and checks the status of the authentication server if acknowledgment data is received from the authentication server.

22 Claims, 17 Drawing Sheets

(51) Int. Cl.
*G06F 21/34* (2013.01)
*G06F 21/62* (2013.01)
*G06Q 50/00* (2012.01)

(56) References Cited

U.S. PATENT DOCUMENTS

2009/0235341 A1  9/2009  Hashimoto
2011/0099626 A1  4/2011  Tsujimoto
2012/0191601 A1  7/2012  Yoshida

FOREIGN PATENT DOCUMENTS

| JP | 2010-066798 A | 3/2010 |
|---|---|---|
| JP | 2011-95792 A | 5/2011 |
| JP | 2011-180679 A | 9/2011 |
| JP | 2012-151781 A | 8/2012 |

OTHER PUBLICATIONS

Yoshimoto et al., "Compatibility Between Usability and Security on Security Products," Presented to an academic conference, the Human Interface Symposium 2010 (Sep. 7, 2010), organized by the Human Interface Society, pp. 593-600. (Document for an example of a well-known technique), with Partial English translation (Automatic Periodic Scans, Section 2.2.6).

Office Action (Notification of Reasons for Refusal) issued on Mar. 31, 2015, by the Japanese Patent Office in corresponding Japanese Patent Application No. 2013-094778, and an English Translation of the Office Action. (11 pages).

* cited by examiner

Authentication Information — 4

| User Name | User ID | Password | Power User | Restriction Information |
|---|---|---|---|---|
| User A | 12345 | ***** | NO | No Restriction |
| User B | 24680 | ***** | NO | Full-color printing prohibited |
| User C | 09876 | ***** | NO | Facsimile function prohibited |
| User D | 20121 | ***** | NO | Copier function prohibited |
| User E | 10101 | ***** | YES | No Restriction |

FIG.4

Charge Map — 5, 5a, 5b, 5c, 5d

| User A | |
|---|---|
| Black-and-white Printing | 10 |
| Single-color Printing | 15 |
| Full-color Printing | 15 |
| Stapling | 10 |
| Hole Punching | 10 |
| Facsimile Transmission | 10 |
| File Transfer | 10 |

FIG.5

Allowed Amount of Money — 6

| User Name | Allowed Amount of Money |
|---|---|
| User A | 50,000 |
| User B | 60,000 |
| User C | 15,000 |
| User D | 20,000 |
| User E | 40,000 |

FIG.6

IMAGE PROCESSING APPARATUS, IMAGE PROCESSING SYSTEM, METHOD OF PERFORMING STATUS MONITORING TO CHECK IF AUTHENTICATION SERVER RECOVERS FROM DOWN STATUS, AND RECORDING MEDIUM

This application claims priority under 35 U.S.C. §119 to Japanese Patent Application No. 2013-094778 filed on Apr. 26, 2013, the entire disclosure of which is incorporated herein by reference in its entirety.

BACKGROUND OF THE INVENTION

1. Field of the Invention

The present invention relates to: an image processing apparatus being capable of accessing an authentication server, the image processing apparatus performing status monitoring to check if the authentication server recovers from down status; an image processing system having the image processing apparatus; a method of performing status monitoring to check if the authentication server recovers from down status; and a recording medium storing a program of performing status monitoring to check if the authentication server recovers from down status.

2. Description of the Related Art

The following description sets forth the inventor's knowledge of related art and problems therein and should not be construed as an admission of knowledge in the prior art.

Some image processing apparatuses such as multi-function peripherals (MFPs), i.e., multifunctional digital machines having various functions such as copier function, printer function, scanner function, and facsimile (FAX) function, further have a function of managing charge information and counter information of each user or department.

Under the circumstances in which there are a plurality of such MFP, an authentication server needs to manage charge information and counter information to share with the MFPs so that users can use any of the MFPs under equal conditions. To achieve this, there is a suggested method of allowing the MFPs to access the authentication server to obtain necessary information therefrom, when a user makes a request for log-on to the MFPs.

There is another suggested method of allowing the MFPs to store user information so that users can use it to make a request for log-on to the MFPs while the authentication server is down because of a trouble.

Furthermore, there are a variety of other suggested methods of allowing the MFPs to: store user information of users registered thereon and accumulated information including charge information and counter information about executed jobs while the authentication server is down; and exchange information with the authentication server to update the information stored on the MFPs themselves, when the authentication server recovers from down status.

As an example thereof, Japanese Unexamined Patent Publication No. 2012-151781 discloses a method of allowing the MFPs to: store charge information and counter information about executed jobs as accumulated information, while the authentication server is down; and exchange information with the authentication server to update the information stored on the MFPs themselves, when the authentication server recovers from down status.

Japanese Unexamined Patent Publication No. 2011-095792 discloses a method of allowing the MFPs to: check if the authentication server recovers from down status, at a predetermined time; and transfer an entire job history when the authentication server recovers.

Japanese Unexamined Patent Publication No. 2009-170994 discloses a method of allowing the MFPs to: check if the authentication server recovers from down status, when executing a job; and transfer an entire job history when the authentication server recovers.

In all the techniques of the above-mentioned patent publications, the MFPs transfer accumulated information stored on the MFPs themselves to the authentication server after the authentication server recovers from down status. Also in all these techniques, the MFPs perform status monitoring by checking if the authentication server recovers from down status, at a regular time, which caused some problems as described below.

That is, the MFPs may perform status monitoring by checking the server status at a predetermined time under the circumstances in which users of the MFPs are registered or deregistered frequently. In such a case, the MFPs can wrongly reject a user who has just been registered on the authentication server even after the authentication server recovers from down status, because the latest registration is not effective yet on the MFPs before the time to check the server status, which is very inconvenient.

Similarly, the MFPs can wrongly accept a user who has just been deregistered from the authentication server even after the authentication server recovers from down status, because the latest deregistration is not effective yet on the MFPs before the time to check the server status, which is very inconvenient as well.

For the above-mentioned reason, under the circumstances in which users of the MFPs are registered or deregistered frequently, it is preferred that the MFPs perform status monitoring by checking the status of the authentication server when log-on is requested.

In contrast, under the circumstances in which users of the MFPs are not registered or deregistered frequently, there would be fewer such problems as described above; however, status monitoring on the authentication server would interfere with log-on processing more frequently. To solve the problem, it is preferred that the MFPs perform status monitoring by checking the status of the authentication server at a predetermined time.

Meanwhile, under the circumstances in which many users use the MFPs, the MFPs would be required to execute many jobs while the authentication server is down; when a user makes a request for log-on to the MFPs, the operation of status monitoring on the authentication server and transferring accumulated information stored on the MFPs would interfere with log-on processing. To solve the problem, it is preferred that the MFPs perform status monitoring by checking the status of the authentication server at a predetermined time.

In contrast, under the circumstances in which a small number of users use the MFPs, it is preferred that the MFPs perform status monitoring by checking the status of the authentication server when log-on is requested, in order to giving priority to the operation of transferring accumulated information to the authentication server and recovering amounts of charge and counter values as they were before the authentication server went down, over log-on processing.

The discussion given above can be summarized as follows: it is preferred that the MFPs perform status monitoring to check if the authentication server recovers from down status, at a different time depending on the number of users or the pattern of use of the MFPs.

Actually, in all the techniques of the above-mentioned patent publications, the MFPs perform status monitoring by checking the status of the authentication server at a regular time, thus such demands cannot be met.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus comprising:
- a transmitter that transmits user information to an authentication server, the user information being input by a user when log-on is requested;
- a receiver that receives an authentication result from the authentication server, the authentication result being obtained by the authentication server on the basis of the user information;
- a job execution portion that executes a job as instructed by the user if the authentication result proves that the user is successfully identified as an authorized user;
- a register storage that stores accumulated information including information about the job executed by the job execution portion;
- an information transfer portion that transfers the accumulated information to the authentication server, the accumulated information being stored on the register storage;
- a detector that detects an event if the authentication server is down;
- a time settings portion that specifies either "at a predetermined time" or "when log-on is requested", as the time to check the status of the authentication server, after the detector detects that event; and
- a status checking portion that: transmits acknowledgment request data to the authentication server at the time specified by the time settings portion; and checks the status of the authentication server if acknowledgment data is received from the authentication server in response to the acknowledgment request data.

A second aspect of the present invention relates to an authentication system comprising: an authentication server and an image processing apparatus, the authentication server and the image processing apparatus being capable of accessing each other, the authentication server comprising:
- a receiver that receives user information from the image processing apparatus, the user information being input to the information processing apparatus by a user when log-on request is issued;
- a register storage that stores user information of a plurality of users for user authentication;
- an authentication portion that performs user authentication by comparing the user information received from the image processing apparatus to the user information stored on the register storage; and
- a transmitter that transmits an authentication result to the image processing apparatus, the authentication result being obtained by the authentication portion, the image processing apparatus comprising:
- a transmitter that transmits the user information to the authentication server, the user information being input by the user when log-on is requested;
- a receiver that receives the authentication result from the authentication server;
- a job execution portion that executes a job as instructed by the user if the authentication result proves that the user is successfully identified as an authorized user;
- a register storage that stores accumulated information including information about the job executed by the job execution portion;
- an information transfer portion that transfers the accumulated information to the authentication server, the accumulated information being stored on the register storage;
- a detector that detects an event if the authentication server is down;
- a time settings portion that specifies either "at a predetermined time" or "when log-on is requested", as the time to check the status of the authentication server, after the detector detects that event; and
- a status checking portion that: transmits acknowledgment request data to the authentication server at the time specified by the time settings portion; and checks the status of the authentication server if acknowledgment data is received from the authentication server in response to the acknowledgment request data.

A third aspect of the present invention relates to a method of performing status monitoring to check if an authentication server recovers from down status, the method to be implemented by an authentication system, the authentication system comprising: an authentication server and an image processing apparatus, the authentication server and the image processing apparatus being capable of accessing each other, the authentication server comprising a register storage that stores: user information of a plurality of users for user authentication; and information including allowed functions for the users on the image processing apparatus, the method comprising:
the following steps of the authentication server:
- receiving user information from the image processing apparatus, the user information being input to the information processing apparatus by a user when log-on is requested;
- performing user authentication by comparing the user information received from the image processing apparatus to the user information stored on the register storage; and
- transmitting an authentication result to the image processing apparatus, the authentication result being obtained by user authentication; and the following steps of the image processing apparatus:
- transmitting the user information to the authentication server, the user information being input by the user when log-on is requested;
- receiving the authentication result from the authentication server;
- executing a job as instructed by the user if the authentication result proves that the user is successfully identified as an authorized user;
- storing accumulated information including information about the executed job;
- transferring the accumulated information to the authentication server, the accumulated information being stored;
- detecting an event if the authentication server is down;

specifying either "at a predetermined time" or "when log-on is requested", as the time to check the status of the authentication server, after that event is detected; and transmitting acknowledgment request data to the authentication server at the selected time then checking the status of the authentication server if acknowledgment data is received from the authentication server in response to the acknowledgment request data.

A fourth aspect of the present invention relates to a non-transitory computer-readable recording medium storing a program of performing status monitoring to check if an authentication server recovers from down status, the program to make a computer of an image processing apparatus execute: transmitting user information, the user information being input by a user when log-on is requested;

receiving an authentication result from the authentication server;

executing a job as instructed by the user if the authentication result proves that the user is successfully identified as an authorized user;

storing accumulated information including information about the executed job;

transferring the accumulated information to the authentication server, the accumulated information being stored;

detecting an event if the authentication server is down;

specifying either "at a predetermined time" or "when log-on is requested", as the time to check the status of the authentication server, after that event is detected; and transmitting acknowledgment request data to the authentication server at the selected time then checking the status of the authentication server if acknowledgment data is received from the authentication server in response to the acknowledgment request data.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a view exemplifying authentication information;

FIG. 5 is a view exemplifying a charge map;

FIG. 6 is a view exemplifying allowed-amount-of-money information;

FIG. 16 is a flowchart representing an operation of the image processing apparatus, which is suspending the operation of checking the status of the authentication server at a predetermined time, while a user is operating to make a request for log-on;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described in combination with the accompanying drawings.

Figure 1:
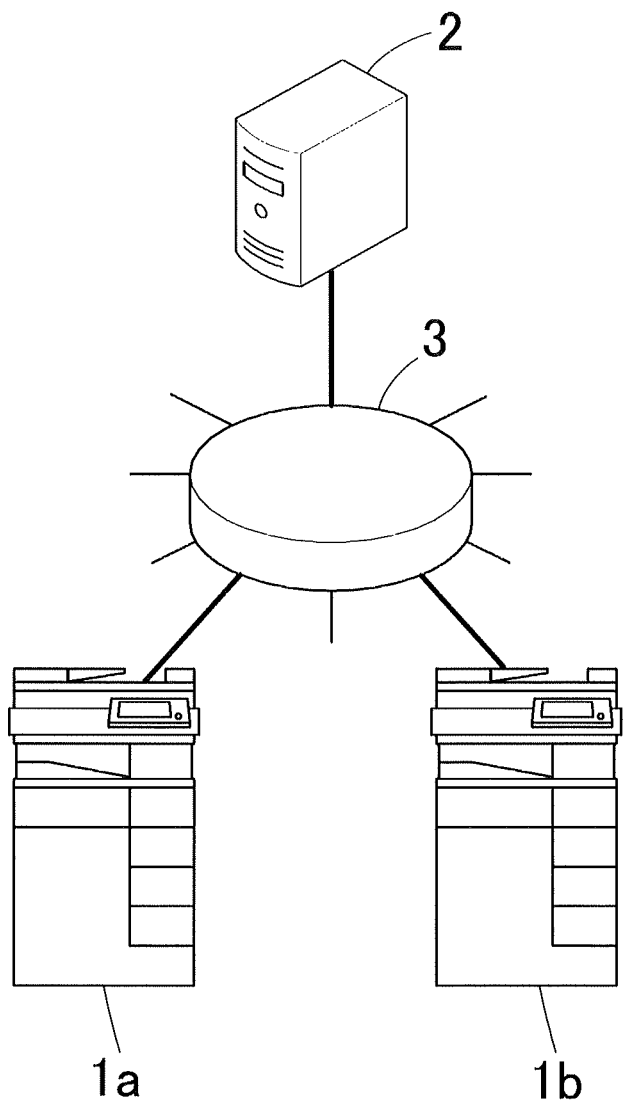
FIG. 1 is a view exemplifying a schematic configuration of an image processing system according to one embodiment of the present invention.

FIG. 1 is a view exemplifying a schematic configuration of an image processing system according to one embodiment of the present invention. The image processing system, which can be commonly seen in places such as office environments, is provided with a plurality of image processing apparatuses 1*a* and 1*b* and an authentication server 2, all of which are capable of performing data communication with each other via a network 3.

The image processing apparatuses 1*a* and 1*b* are each composed of an MFP, i.e., a multifunctional digital machine having various functions such as copier function, facsimile function, and scanner function, in this embodiment. The image processing apparatuses 1*a* and 1*b* execute a job that corresponds to a function selected by user. Hereinafter, the image processing apparatuses will also be referred to as MFPs.

Although there are the two MFPs 1*a* and 1*b* connected to the network 3 in FIG. 1, the number of MFPs is not necessarily limited to this embodiment: there may be one single MFP or more than two MFPs. Hereinafter, the two MFPs 1*a* and 1*b* will be represented as the MFPs 1 without being identified one from another.

The authentication server 2 performs user authentication on users who operate the MFPs 1 and calculates amounts of charge for jobs to be executed by the MFPs 1 as instructed by the users by managing the MFPs 1 in a unified manner. More specifically, when a user instructs any of the MFPs 1 to execute a job, the authentication server 2 calculates the user's amount of charge for the job; upon receiving a request for charging the user from the MFP 1, the authentication server 2, which stores allowed amounts of money for registered users, subtracts the amount of charge from an allowed amount of money for the user.

The authentication server 2 also stores upper limits on counter information including the number of executed jobs and the number of pages used by the jobs, as conditions of use. Hereinafter, in all the embodiments to be described below, counter information will be handled equally to charge information without explanatory remarks.

The network 3 serves as a communication medium for performing data communication physically or wirelessly. The network 3 is composed of a local area network (LAN) that is commonly used in places such as office environments, for example. The network 3 may include an external network such as the Internet.

In the above-mentioned image processing system, when a user instructs the MFP 1 to execute a job, the MFP 1 calculates the user's amount of charge for the job by communicating with the authentication server 2, and after the MFP 1 successfully finishes charge processing, the MFP 1 executes the job. In the embodiment, as long as predetermined conditions are satisfied, the MFP 1 also can execute the job without communicating with the authentication server 2, which will be described in detail below.

Figure 2:
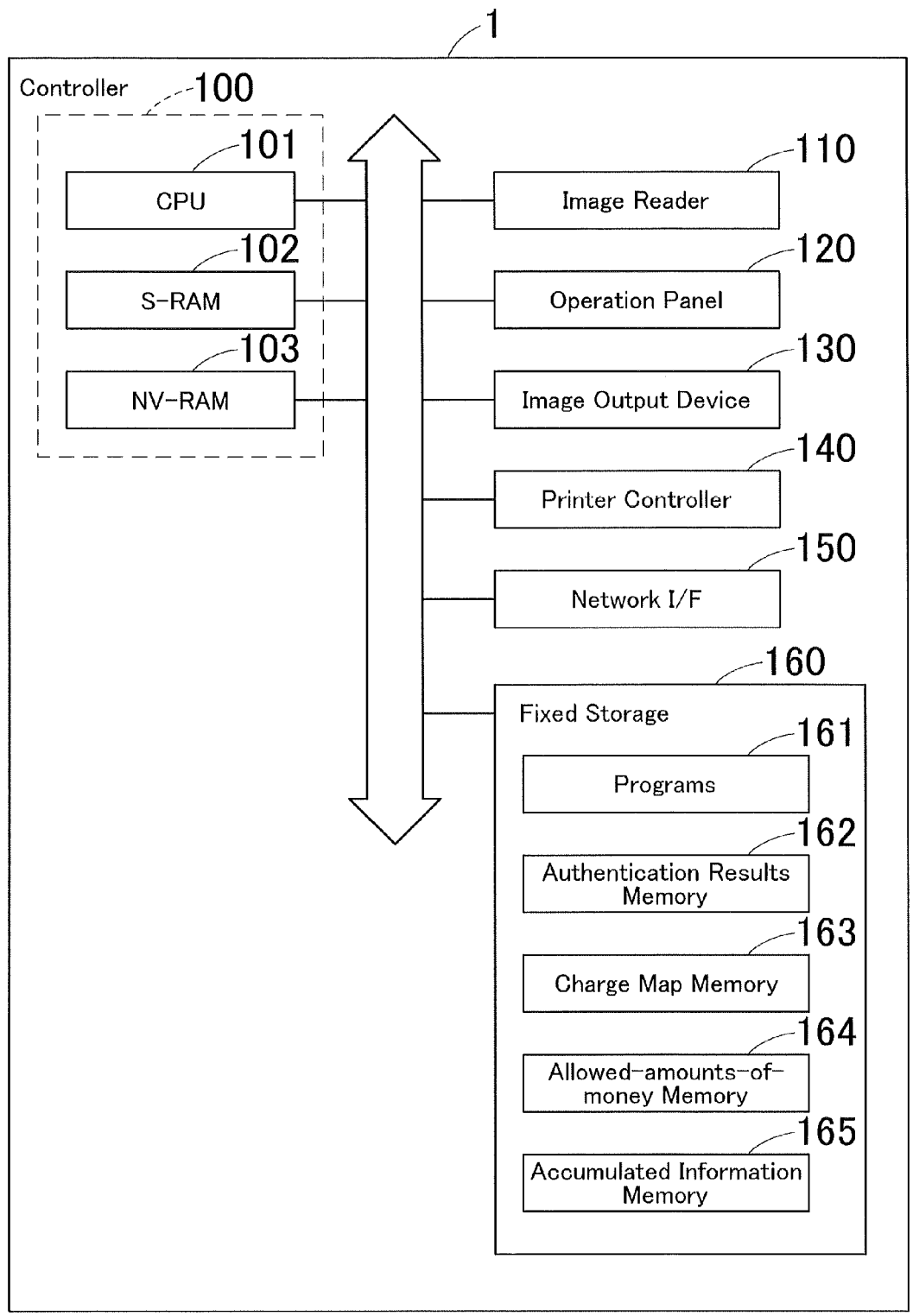
FIG. 2 is a block diagram illustrating an internal configuration of an image processing apparatus.

FIG. 2 is a block diagram illustrating an internal configuration of the MFP 1 that is employed in the image processing system of FIG. 1.

The MFP 1 is an apparatus for forming on a sheet of paper a copy of an image that is converted from a document image scanned by an image reader 110 and a copy of an image generated from print data received from another information processing apparatus by a network interface (network I/F) 150.

Here, print data is a draw command described in a page description language that the MFP 1 can accept, into which a printer driver converts a draw command produced by an operating system or an application program of another information processing apparatus; alternatively, it is a document file described in PDF, TIFF, JPEG, XPS, or another file format.

The MFP 1 is capable of transferring scanned document images to other information processing apparatuses and other MFPs through the network I/F 150. The MFP 1 is also capable of storing scanned document images and document files received from other information processing apparatuses, on a fixed storage 160.

The MFP 1 has a controller 100; the controller 100 is composed of: a CPU 101; a static random access memory (S-RAM) 102 for fast processing; and a non-volatile memory (NV-RAM) 103 that is a battery backup storage storing various image forming settings, all of which are connected to each other via a bus network.

Connected to the controller 100 via the bus network are: the image reader 110 for reading document images; an operation panel 120 that is provided with various keys for input and a display; the network I/F 150 for supporting information exchange with external apparatuses; a printer controller 140 for generating images from print data received by the network I/F 150; and an image output device 130 for forming copies of images.

Also connected to the controller 100 via the bus network is the fixed storage 160. The fixed storage 160 is a hard disk drive, for example. The fixed storage 160 stores programs 161 to be executed by the CPU 101 of the image processing apparatus. The fixed storage 160 also has: an authentication results memory 162; a charge map memory 163; an allowed-amount-of-money memory 164; and an accumulated information memory 165, as memory areas for storing various kinds of information.

The authentication results memory 162 stores information of users who are identified as being authorized as a result of user authentication by the authentication server 2. More specifically, the authentication results memory 162 stores: user IDs of log-on users; passwords; power user information indicating whether it is a power user or not; information indicating restricted functions; and settings information to access the server with. The authentication results memory 162 also can store smart card information or biological information depending on the authentication system employed herein.

Therefore, without communicating with the authentication server 2, the MFP 1 performs user authentication with the information stored on the authentication results memory 162.

The charge map memory 163 is a memory area for storing a charge map for each user, which is received from the authentication server 2.

The allowed-amount-of-money memory 164 is a memory area for storing allowed amounts of money for all users; when a user is successfully logged on, the user's allowed amount of money is received from the authentication server 2. When a user instructs the MFP 1 to execute a job, a value is subtracted from the user's amount of money stored on the charge map memory 163.

The accumulated information memory 165 stores amounts of charge and counter values, which are information about results of jobs executed by the MFP 1 as instructed by log-on user, and information such as job IDs for identifying one job from another.

Figure 3:
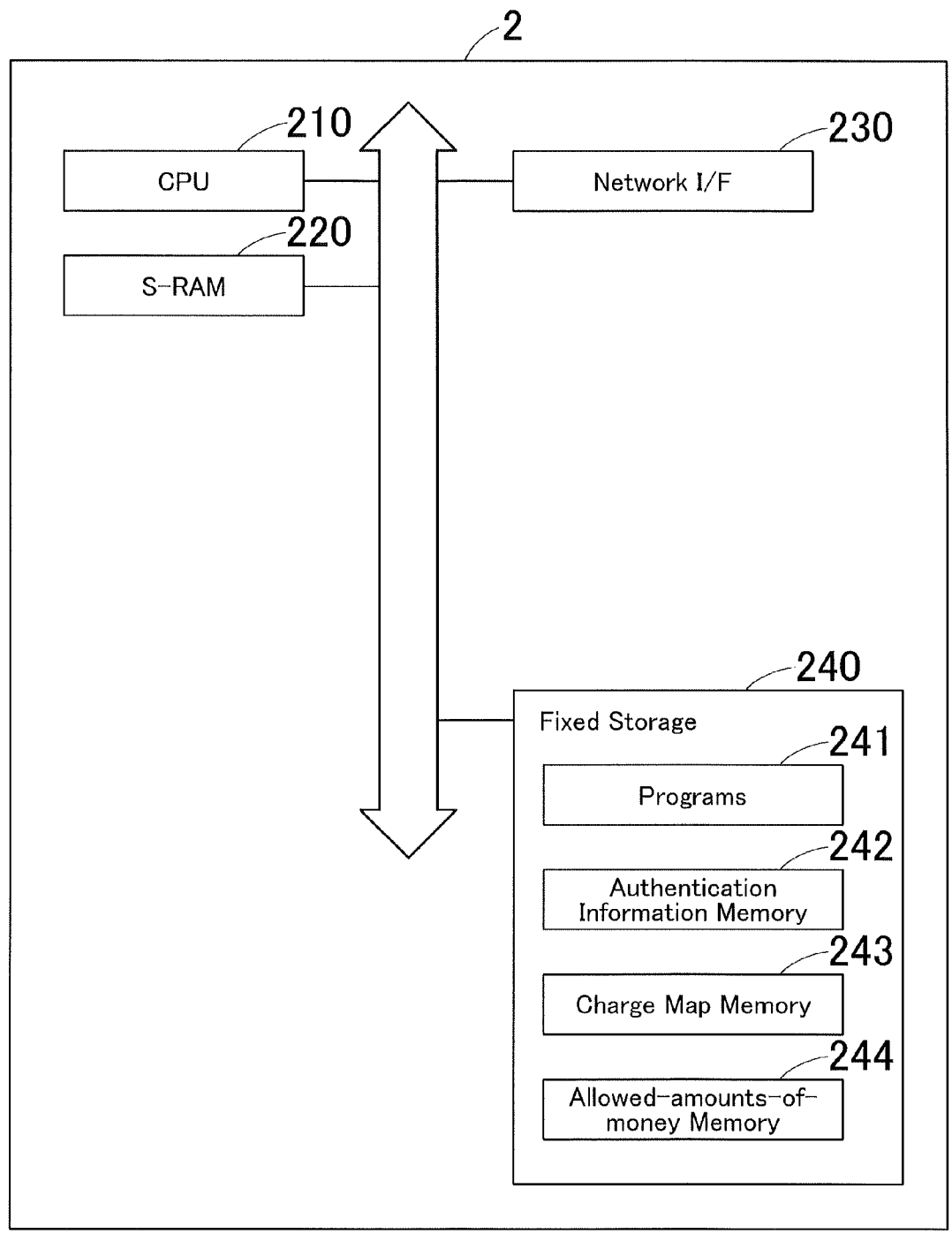
FIG. 3 is a block diagram illustrating an internal configuration of an authentication server.

FIG. 3 is a block diagram illustrating an internal configuration of the authentication server 2.

As illustrated in FIG. 3, the authentication server 2 is provided with: a CPU 210; an S-RAM 220 for fast processing; a network I/F 230; and a fixed storage 240, all of which are connected to each other via a data bus for mutual data input and output.

The CPU 210 executes programs 241 stored on the fixed storage 240.

The fixed storage 240 is composed of a non-volatile recording medium such as a hard disk drive. The fixed storage 240 stores the programs 241. The fixed storage 240 also has: an authentication information memory 242; a charge map memory 243; and an allowed amount-of-money memory 244.

The authentication information memory 242 stores authentication information. Authentication information serves for the authentication server 2 to perform user authentication on users who use the MFP 1.

FIG. 4 is a view exemplifying the authentication information. FIG. 4 shows authentication information 4, i.e., the following registered information of all users: user names; user IDs; passwords; power user information; and restriction information. In FIG. 4, information of five users, i.e., Users A, B, C, D, and E is registered, for example.

These registered users in the authentication information 4 are allowed to use all the MFPs 1 on the network 3. User IDs and passwords in the authentication information 4 serve to identify users as being registered or not registered. Power user information indicates whether or not it is a power user with special powers, not an ordinary user. Power user information indicates "YES" if it is a power user and "NO" if it is an ordinary user. For example, supervisory users such as general managers and section chiefs are registered as power users and non-supervisory users are registered as ordinary users. In FIG. 4, User E is registered as a power user.

Restriction information serves to restrict all users to use functions on the MFP 1. In FIG. 4, the restriction information indicates that User B is prohibited from using full-color printing, for example. Furthermore, the restriction information indicates that User C is prohibited from using facsimile function and User D is prohibited from using copier function. The restriction information indicates that Users A and E are permitted to use all functions of the MFP 1 without any restriction.

The charge map memory 243 is a memory area for storing a charge map. When a user instructs the MFP 1 to execute a job, the user's amount of charge for the job is calculated on the basis of a charge map. The charge map is information including a list of jobs and a charge for each job. One charge map may be stored for each user.

FIG. 5 is a view exemplifying a charge map 5. The charge map 5 has a plurality of charge maps 5a, 5b, 5c, and 5d for respective users registered in the authentication information 4; the charge maps 5a, 5b, 5c, and 5d match Users A, B, C, and D registered in the authentication information 4, respectively. In FIG. 5, the charge map 5a of User A indicates that 10 yen per page is charged for black-and-white printing and 15 yen per page will be charged for one-color printing, for example. As understood in the charge map 5a of User A, unit charges are given to all functions allowed for User A. The same is true for the charge maps 5b, 5c, and 5d of Users B, C, and D, respectively; a unit charge for each job may be different depending on the user.

The allowed-amount-of-money memory 244 is a memory area for storing allowed-amount-of-money information. The allowed-amount-of-money information, which is managed every user, defines amounts of money which a user can use for job execution.

The authentication server 2 transfers a predetermined amount of money to the MFP 1; after the MFP 1 executes a job the authentication server 2 calculates an allowed amount of money on the basis of an amount of charge for the job or an allowed amount of money for the MFP 1, which is received from the MFP 1. The MFP 1 calculates an allowed amount of money on the basis of a specified amount of money received from the authentication server 2. When a user instructs the MFP 1 to execute a job, the MFP 1 calculates an amount of charge for the job on the basis of the charge map 5; if the user's allowed amount of money is greater than the calculated amount of charge, the MFP 1 executes the job.

FIG. 6 is a view exemplifying allowed-amount-of-money information 6. The allowed-amount-of-money information 6, which corresponds to respective users registered in the authentication information 4, indicates amounts of money for the user. The allowed-amount-of-money information 6 indicates that User A is allowed to spend money up to 50,000 yen for job execution, for example, and similarly other users are also allowed to spend money up to respective allowed amounts for job execution. Users can specify desirable monetary units in advance for their allowed amount of money.

Similarly, as for counter information management, allowed counter value for all users are specified and stored in advance.

Hereinafter, operations of the image processing system for the case in which the authentication server 2 is operating normally will be described.

The MFP 1 monitors the operation status of the authentication server 2 by server status flag. Depending on the operation status of the authentication server 2, the server status flag is "Operating Normally" or "Down".

Figure 7:
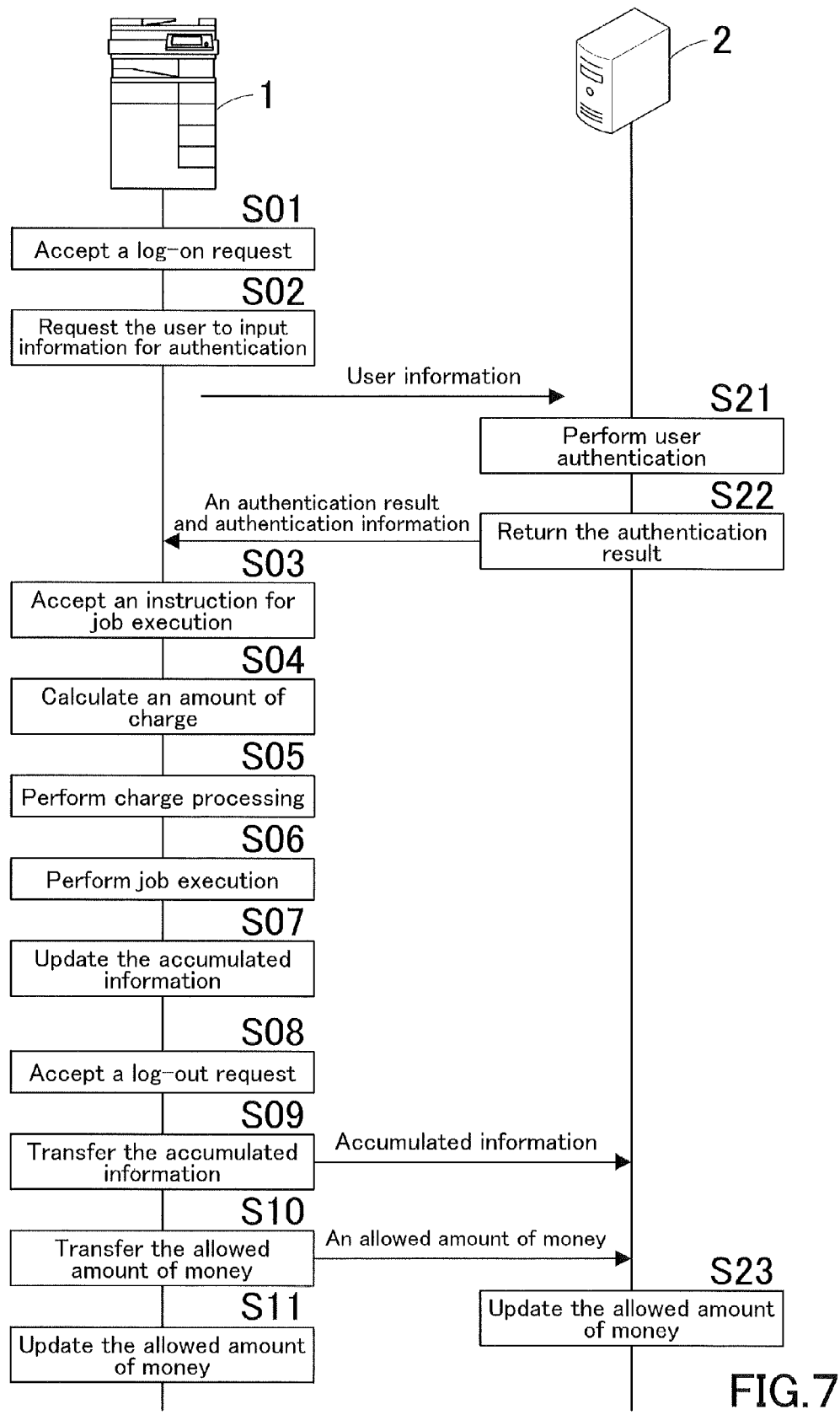
FIG. 7 is a flowchart representing operations of the image processing apparatus and the authentication server for the case in which the authentication server is operating normally.

FIG. 7 is a flowchart representing operations of the MFP 1 and the authentication server 2 for the case in which the authentication server 2 is operating normally.

The flowchart of FIG. 7 and the following flowcharts are executed by the CPU 101 of the MFP 1 in accordance with the operation programs 161 stored on the fixed storage 110 or by the CPU 210 of the authentication server 2 in accordance with the operation programs 241 of the fixed storage 240.

In Step S01, the MFP 1 accepts a log-on request of a user. Then the flowchart proceeds to Step S02, in which the MFP 1 requests the user to input user information such as an user ID and a password for user authentication and transfers user information input by the user to the authentication server 2. The user information may be scanned smart card information or scanned biological information depending on the authentication method selected.

In Step S21, upon receiving the user information, the authentication server 2 performs user authentication, i.e., judges whether or not it is an authorized user on the basis of authorized user information indicating registered users, which is stored on the authentication information memory 242. In Step S22, if it is an authorized user, the authentication server 2 returns the authentication result along with authentication information. The authentication result (authorization succeeded) will be referred to as "OK". The authentication information includes: user identification information of the authorized user such as the User ID and the password; a charge map of the authorized user; restriction functions of the authorized user on the MFP 1; and an allowed amount of money for the authorized user. If it is not an authorized user, the authentication server 2 returns the authorization result (authentication failed), which will be referred to as "NG".

With the above-mentioned information received from the authentication server 2, the MFP 1 updates the information stored on the authentication results memory 162, the charge map memory 163, and the allowed-amount-of-money memory 164. In Step S03, the log-on user instructs the MFP 1 to execute a job. Subsequently, the MFP 1 calculates an amount of charge for the job on the basis of the charge map in Step S04 and performs charge processing by subtracting the amount of charge from the allowed amount of money in Step S05. If the allowed amount of money is greater than the amount of charge, the MFP 1 executes the job in Step S06, accepting the user instructions. Then in Step S07, the MFP 1 performs accumulated information updating by storing the amount of charge and job execution information that are information about the result of the executed job, on the accumulated information memory 165 in Step S07.

When the user makes a request for log-out, the MFP 1 accepts the request in Step S08, transfers the accumulated information to the authentication server 2 in Step S09, and returns the allowed amount of money that decreased by subtraction, to the authentication server 2 in Step S10. Upon receiving the information, the authentication server 2 updates the allowed amount of money by subtracting the amount of charge from the allowed amount of money in Step S23.

After returning the allowed amount of money, in Step S11, the MFP 1 updates the allowed amount of money by adding the amount of charge, which is a part of the accumulated information transferred to the authentication server 2, to the allowed amount of money.

In the above-mentioned embodiment, the MFP 1 obtains an allowed amount of money when log-on is requested; subtracts an amount of charge from the allowed amount of money when an instruction to execute the job is issued; and transfers accumulated information and the allowed amount of money when log-out request is issued. Here, the MFP 1 can transfer accumulated information and the allowed amount of money when an instruction to execute a job is issued, not when log-out is requested. In such a configuration, when the authentication server 2 is down while a user is logged on, an amount of charge for jobs having been executed as instructed by a log-on user before the authentication server 2 goes down is reflected in the allowed amount of money for the user.

If no response to transferred data is received from the authentication server 2 for a certain period of time, the CPU 101 of the MFP 1 detects this and judges that the authentication server 2 is down because of a trouble. Then the CPU 101 of the MFP 1 turns the server status flag "Down" and performs status monitoring by checking the status of the authentication server 2 at a predetermined time.

Hereinafter, the following operations: log-on processing; job execution processing; and status monitoring on the authentication server 2, for the case in which the authentication server 2 is down, will be described in order.

Figure 8:
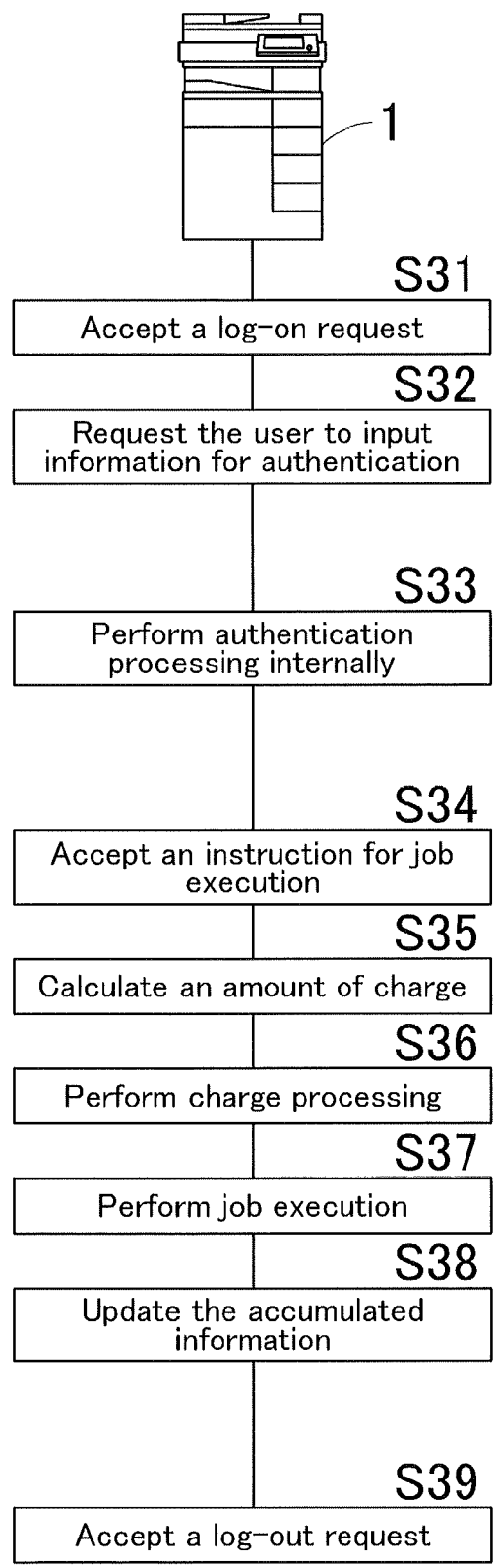
FIG. 8 is a flowchart representing an operation of the information processing apparatus for the case in which the authentication server is down.

FIG. 8 is a flowchart representing an operation of the MFP 1 for the case in which the authentication server 2 is down.

In Step S31, the MFP 1 accepts a log-on request of a user. Then the MFP 1 requests the user to input user information (for user authentication) in Step S32. When the user inputs user information, the MFP 1 internally performs authentication processing in Step S33. That is, as described above with reference to FIG. 7, user identification information is obtained from the authentication server 2 and stored on the authentication results memory 162 before the authentication server 2 goes down; on the basis of the information stored thereon, the MFP 1 judges whether or not the user is authorized to log on.

In Step S34, the log-on user instructs the MFP 1 to execute a job. In Step S35, the MFP 1 calculates an amount of charge for the job on the basis of the charge map obtained and stored on the charge map memory 163 before the authentication server 2 goes down; in Step S36, the MFP 1 performs charge processing by subtracting the calculated amount of charge from the allowed amount of money stored on the allowed-amount-of-money memory 164. After charge processing, the MFP 1 executes the job in Step S37, then stores the amount of charge and job execution information on the accumulated information memory 165, as accumulated information in Step S38. After that, the user makes a request for log-out in Step S39.

Figure 9:
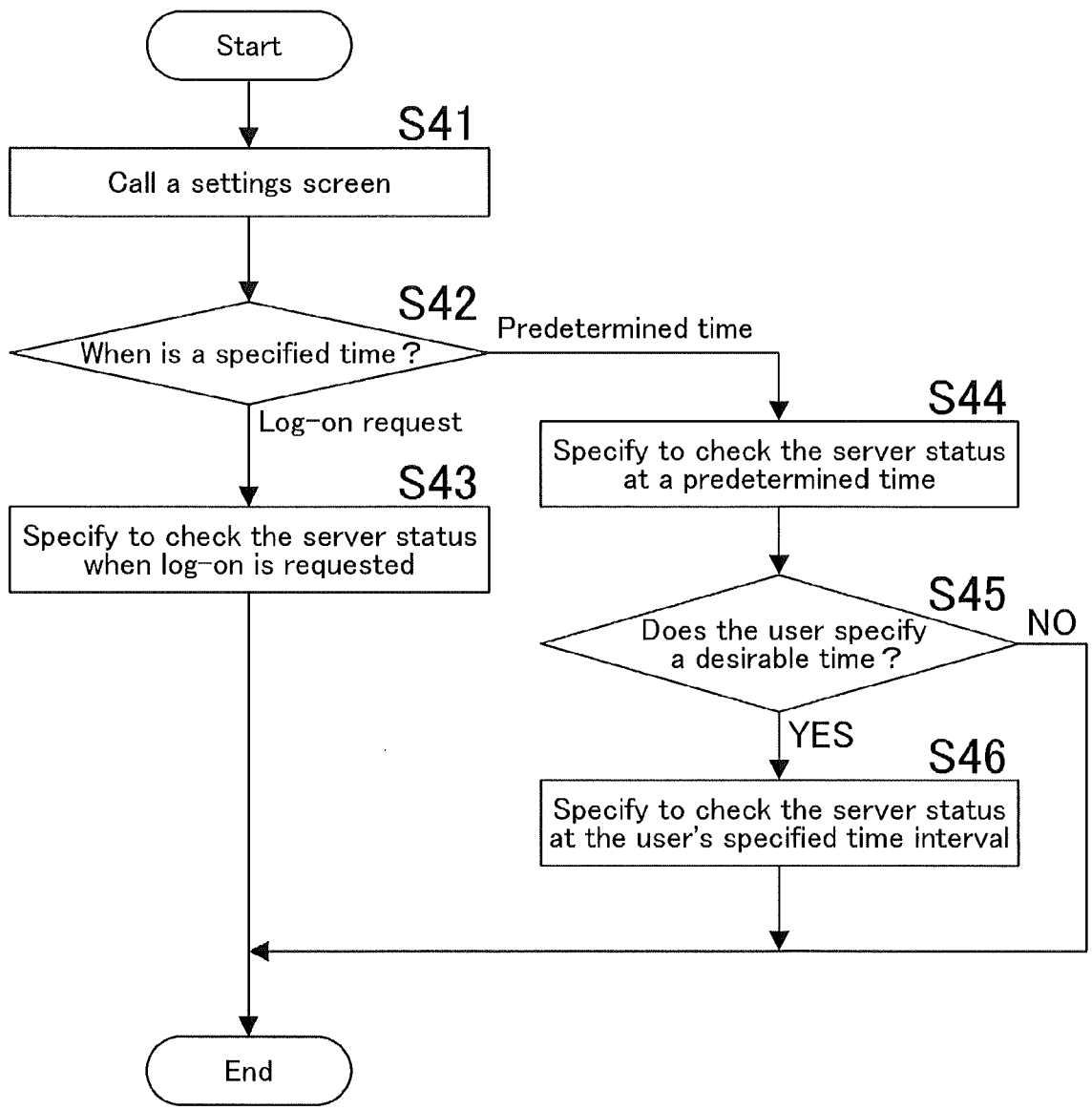
FIG. 9 is a flowchart representing an operation of the image processing apparatus, which is specifying the time to check the status of the authentication server, as instructed by user.

FIG. 9 is a flowchart representing an operation of the MFP 1 as an example for explanation, which is specifying the time to check the status of the authentication server 2. In this example, the MFP 1 prepares to check the status of the authentication server 2 at a time specified by a user from an input portion of the MFP 1.

In Step S41, the MFP 1 calls a settings screen and displays on the operation panel 120 as instructed by a user. The user specifies the time to check if the authentication server 2 recovers from down status, via the settings screen; then the MFP 1 detects that time in Step S42. If it is "when log-on is requested" ("log-on request" in Step S42), the MFP 1 specifies to perform status monitoring by checking the server status when log-on is requested in Step S43. If it is "at a predetermined time" ("predetermined time" in Step S42), the MFP 1 specifies to perform status monitoring by checking the server status at a predetermined time, i.e., at a predetermined time interval in Step S44.

In Step S45, the MFP 1 judges whether or not the user specifies a desirable time as the time to check the server status. If the user specifies a desirable time (YES in Step S45), the MFP 1 specifies to perform status monitoring by checking the server status at the user's specified time interval in Step S46.

Figure 10:
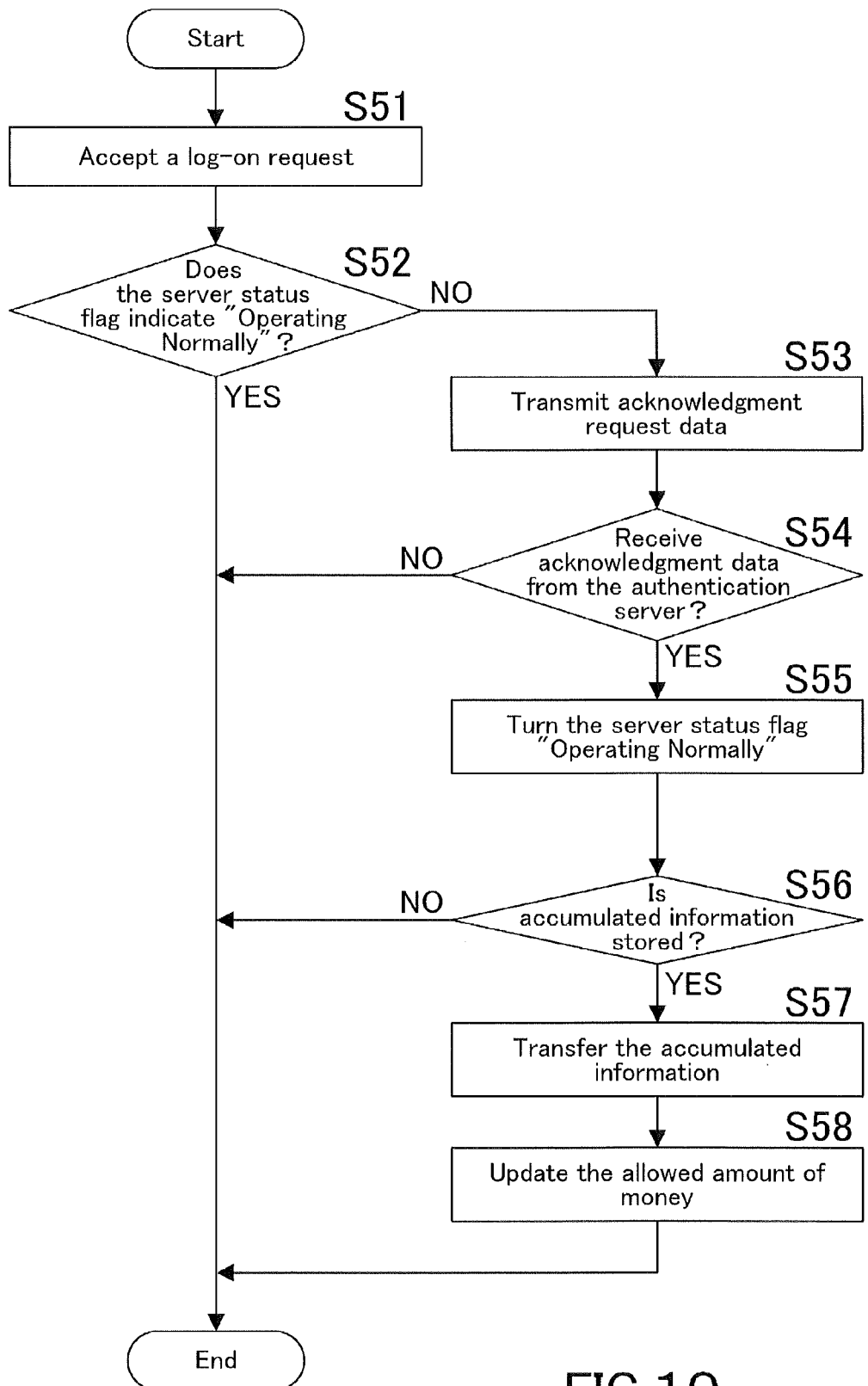
FIG. 10 is a flowchart representing an operation of the image processing apparatus, which is performing status monitoring by checking if the authentication server recovers from down status, when log-on is requested.

FIG. 10 is a flowchart representing an operation of the MFP 1 for explanation, which is performing status monitoring by checking if the authentication server recovers from down status, when log-on is requested. This flowchart is executed when log-on is requested in Step S01 of the flowchart of FIG. 7 or in Step S31 of the flowchart of FIG. 8.

In Step S51, the MFP 1 accepts a log-on request of a user. Then the MFP 1 judges whether or not the server status flag indicates "Operating Normally" in Step S52. If it indicates "Operating Normally" (YES in Step S52), the flowchart terminates to continue to the above-mentioned flowchart of FIG. 7 for the case in which the authentication server 2 is operating normally. If it does not indicate "Operating Normally" (NO in Step S52), the MFP 1 transmits acknowledgment request data to the authentication server 2 in Step S53. Then the flowchart proceeds to Step S54.

In Step S54, the MFP 1 judges whether or not acknowledgment data is received from the authentication server 2 in response to the acknowledgment request data within a certain period of time. If it is not received (NO in Step S54), the flowchart terminates. Then the flowchart continues to the above-mentioned flowchart of FIG. 8 for the case in which the authentication server 2 is down.

If acknowledgment data is received (YES in Step S54), the MFP 1 turns the server status flag "Operating Normally" in Step S55, and judges whether or not accumulated information is stored in Step S56.

If accumulated information is not stored (NO in Step S56), the flowchart terminates to continue to the above-mentioned flowchart of FIG. 7 for the case in which the authentication server 2 is operating normally. If accumulated information is stored (YES in Step S56), the MFP 1 transfers the accumulated information to the authentication server 2 in Step S57, and updates the allowed amount of money in Step S58. Then the flowchart terminates to continue to the above-mentioned flowchart of FIG. 7 for the case in which the authentication server 2 is operating normally.

Figure 11:
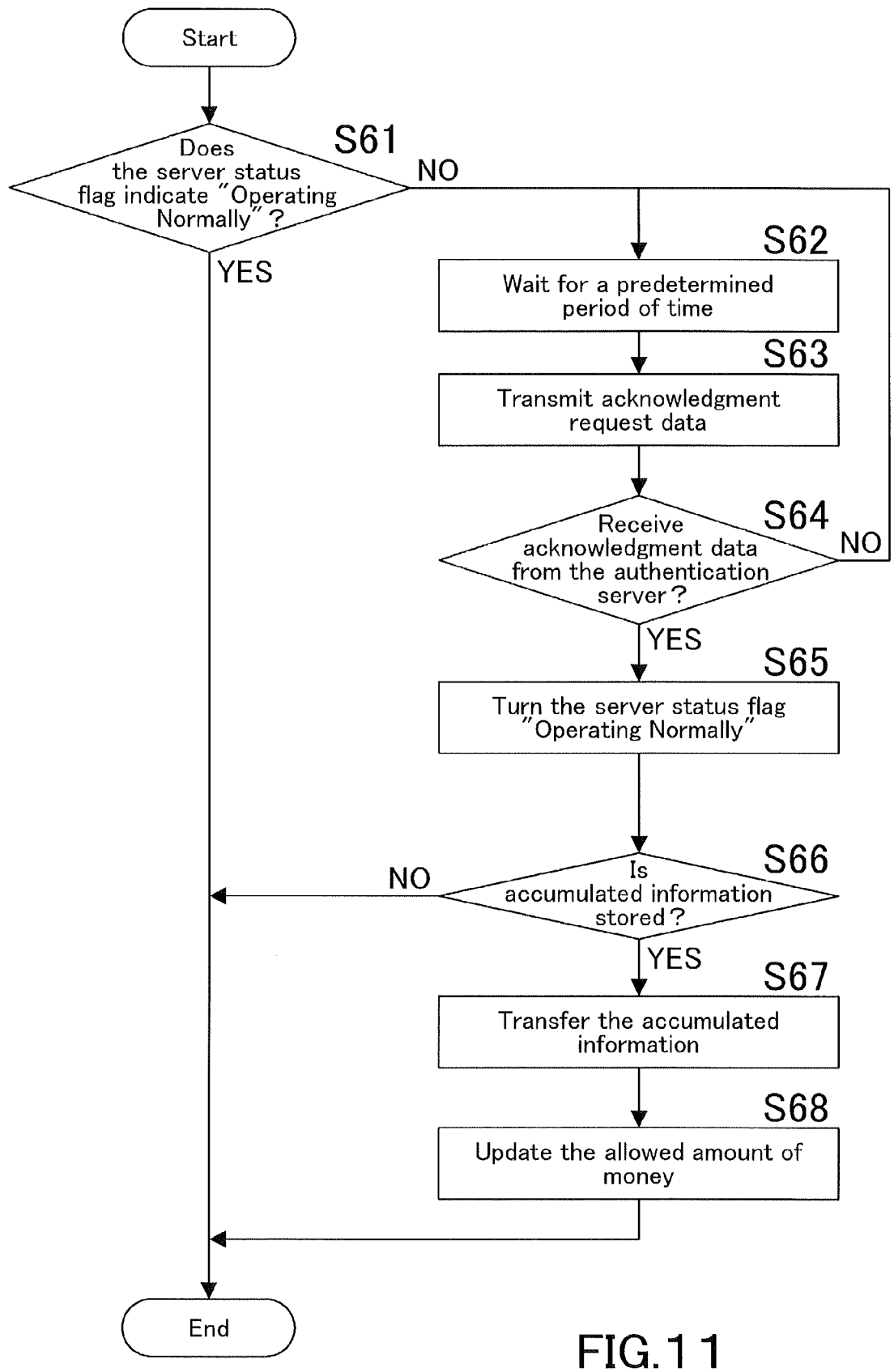
FIG. 11 is a flowchart representing an operation of the image processing apparatus, which is performing status monitoring by checking if the authentication server recovers from down status, at a predetermined time.

FIG. 11 is a flowchart representing an operation of the MFP 1, which is performing status monitoring by checking if the authentication server 2 recovers from down status, at a predetermined time.

In Step S61, the MFP 1 judges whether or not the server status flag indicates "Operating Normally". If it indicates "Operating Normally" (YES in Step S61), the flowchart terminates to continue to the above-mentioned flowchart of FIG. 7 for the case in which the authentication server 2 is operating normally. If it does not indicate "Operating Normally" (NO in Step S61), the flowchart waits for a predetermined period of time in Step S62; after a predetermined period of time, the MFP 1 transmits acknowledgment request data to the authentication server 2 in Step S63. Then the flowchart proceeds to Step S64.

In Step S64, the MFP 1 judges whether or not acknowledgment data is received from the authentication server 2 within a certain period of time in response to the acknowledgment request data. If it is not received (NO in Step S64), the flowchart returns to Step S62.

If acknowledgment data is received (YES in Step S64), the MFP 1 turns the server status flag "Operating Normally" in Step S65, and judges whether or not accumulated information is stored in Step S66.

If accumulated information is not stored (NO in Step S66), the flowchart terminates to continue to the above-mentioned operation of FIG. 7 for the case in which the authentication server 2 is operating normally. If accumulated information is stored (YES in Step S66), the MFP 1 transfers the accumulated information to the authentication server 2 in Step S57, and updates the allowed amount of money in Step S58. Then the flowchart terminates to continue to the above-mentioned flowchart of FIG. 7 for the case in which the authentication server 2 is operating normally.

Figure 12A:
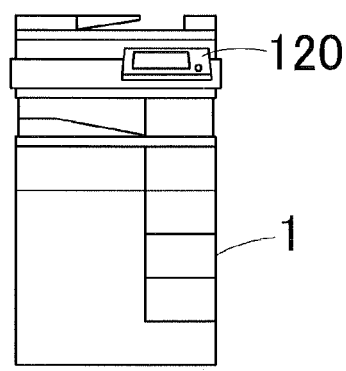
FIGS. 12A and 12B are views to explain a method for users to specify the time to check the status of the authentication server.
Figure 12B:
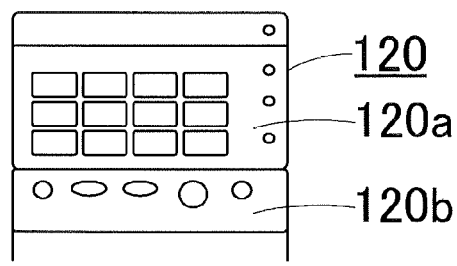

In the above-mentioned embodiment, users specify the time to check the status of the authentication server 2, by operating the MFP 1. More specifically, the MFP 1 is provided with the operation panel 120 as illustrated in FIG. 12A; users perform the settings via settings screens displayed on a touch-enabled display portion 120a by operating the touch panel and a hardware keyboard 120b as illustrated in FIG. 12B. To perform the settings, users also can use another input device such as a voice input device, as well as the display portion 120a and the hardware keyboard 120b.

Figure 13:
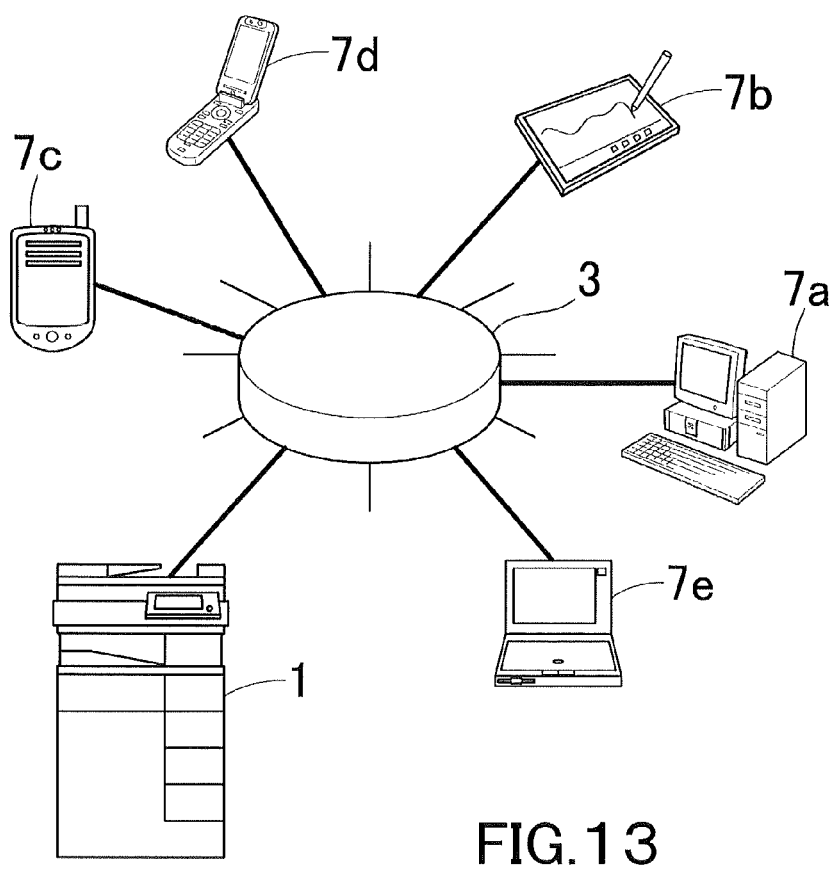
FIG. 13 is a view to explain another method for users to specify the time to check the status of the authentication server.

Furthermore, to specify the time to check the server status, users also can use various types of information processing apparatuses such as personal computers 7a, tablet computer terminals 7b, smartphones 7c, and mobile phones 7d, connected to the MFP 1 via the network 3 as illustrated in FIG. 13. Being accessed from such information processing apparatuses, the MFP 1 displays a dedicated Web page. Such information processing apparatuses may have a dedicated application for accessing the MFP 1, being installed thereon. By operating such information processing apparatuses, users can modify the settings on the MFP 1 and instruct the MFP 1 to perform operations in accordance with the modified settings.

The time to check the server status may be stored in advance on the authentication server 2; in such a case, the authentication server 2 transfers the settings information to the MFP 1 at a desirable time and the MFP 1 prepares to perform status monitoring on the authentication server 2 on the basis of the settings information. In such a configuration, users also can specify the time to check the server status, by operating the authentication server 2. The authentication server 2 can transfer the settings information to the MFP 1 at any time; for example, the authentication server 2 transfers the settings information to the MFP 1 while communicating with the MFP 1 for user authentication due to a log-on request.

Meanwhile, if "when log-on is requested" is specified as the time to check the status of the authentication server 2, it is preferred that the MFP 1 further check the server status when log-out is requested. By checking the status of the authentication server 2 more frequently as described above, the MFP 1 can detect earlier that the authentication server 2 recovers from down status.

Figure 14:
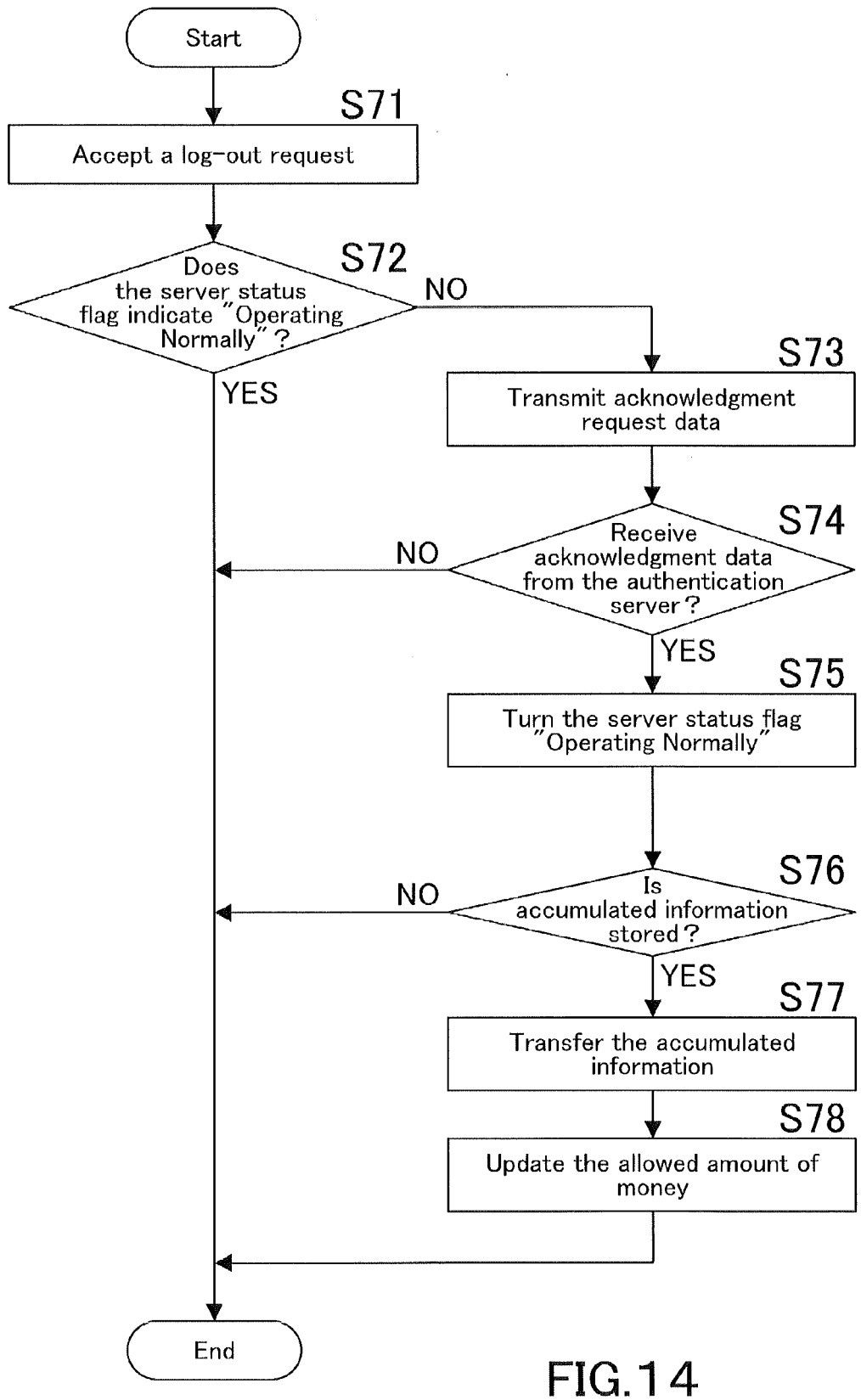
FIG. 14 is a flowchart representing an operation of the image processing apparatus, which is performing status monitoring by checking the status of the authentication server when log-out request is issued.

FIG. 14 is a flowchart representing an operation of the MFP 1 for explanation, which is performing status monitoring by checking the server status when log-out is requested.

This flowchart is executed when log-out is requested in Step S08 of the flowchart of FIG. 7 or in Step S39 of the flowchart of FIG. 8.

In Step S71, a user makes a request for log-out. Then the MFP 1 judges whether or not the server status flag indicates "Operating Normally" in Step S72. If it indicates "Operating Normally" (YES in Step S72), the flowchart terminates to continue to Step S09 of the above-mentioned flowchart of FIG. 7 for the case in which the authentication server 2 is operating normally. If it does not indicate "Operating Normally" (NO in Step S72), the MFP 1 transmits acknowledgment request data to the authentication server 2 in Step S73. Then the flowchart proceeds to Step S74.

In Step S74, the MFP 1 judges whether or not acknowledgment data is received from the authentication server 2 in response to the acknowledgment request data within a certain period of time. If it is not received (NO in Step S44), the flowchart terminates.

If acknowledgment data is received (YES in Step S74), the MFP 1 turns the server status flag "Operating Normally" in Step S75, and judges whether or not accumulated information is stored in Step S76.

If accumulated information is not stored (NO in Step S76), the flowchart terminates to continue to Step S09 of the above-mentioned flowchart of FIG. 7 for the case in which the authentication server 2 is operating normally. If accumulated information is stored (YES in Step S76), the MFP 1 transfers the accumulated information to the authentication server 2 in Step S77, and updates the allowed amount of money in Step S78. Then the flowchart terminates to continue to Step S09 of the above-mentioned flowchart of FIG. 7 for the case in which the authentication server 2 is operating normally.

If "when log-on is requested" is specified as the time to check the status of the authentication server 2, it is preferred that the MFP 1 further check the server status when finishing job execution. By checking the status of the authentication server 2 more frequently as described above, the MFP 1 can detect earlier that the authentication server 2 recovers from down status. In such a case, the MFP 1 can further check the status of the authentication server 2 when log-out is requested as described above with reference to FIG. 14, but it is not necessary.

Figure 15:
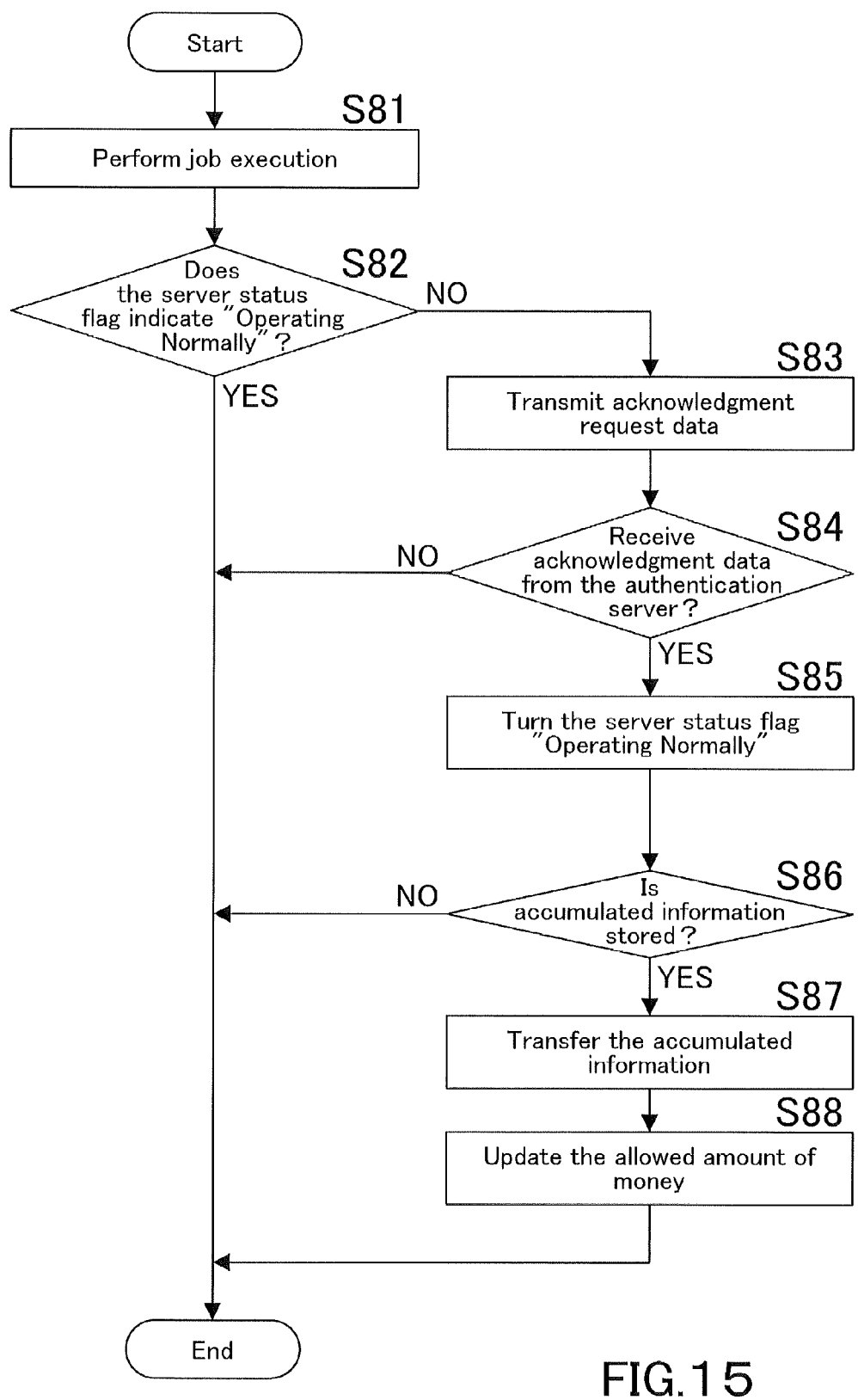
FIG. 15 is a flowchart representing an operation of the image processing apparatus, which is performing status monitoring by checking the status of the authentication server when finishing job execution.

FIG. 15 is a flowchart representing an operation of the MFP 1 for explanation, which is performing status monitoring by checking the server status when finishing job execution.

This flowchart is executed when the MFP 1 executes a job in Step S06 of the flowchart of FIG. 7 or in Step S37 of the flowchart of FIG. 8.

In Step S81, the MFP 1 judges whether or not the server status flag indicates "Operating Normally". If it indicates "Operating Normally" (YES in Step S82), the flowchart terminates to continue to Step S07 of the above-mentioned flowchart of FIG. 7 for the case in which the authentication server 2 is operating normally. If it does not indicate "Operating Normally" (NO in Step S82), the MFP 1 transmits acknowledgment request data to the authentication server 2 in Step S83. Then the flowchart proceeds to Step S84.

In Step S84, the MFP 1 judges whether or not acknowledgment data is received from the authentication server 2 within a certain period of time in response to the acknowledgment request data. If it is not received (NO in Step S84), the flowchart terminates to continue to Step S38 of the flowchart of FIG. 8 for the case in which the authentication server 2 is down.

If acknowledgment data is received (YES in Step S84), the MFP 1 turns the server status flag "Operating Normally" in Step S85, and judges whether or not accumulated information is stored in Step S86.

If accumulated information is not stored (NO in Step S86), the flowchart terminates to continue to Step S07 of the above-mentioned flowchart of FIG. 7 for the case in which the authentication server 2 is operating normally. If accumulated information is stored (YES in Step S86), the MFP 1 transfers the accumulated information to the authentication server 2 in Step S87, and updates the allowed amount of money in Step S88. Then the flowchart terminates to continue to Step S07 of the above-mentioned flowchart of FIG. 7 for the case in which the authentication server 2 is operating normally.

The MFP 1 may check the status of the authentication server 2 at a predetermined time while there is a log-on user. In such a case, status monitoring on the authentication server 2 would interfere with the operation by the log-on user.

To solve the problem, it is preferred that the MFP 1 give priority to the operation by the log-on user by suspending the operation of checking the status of the authentication server 2 at a predetermined time, while there is a log-on user.

Figure 16:
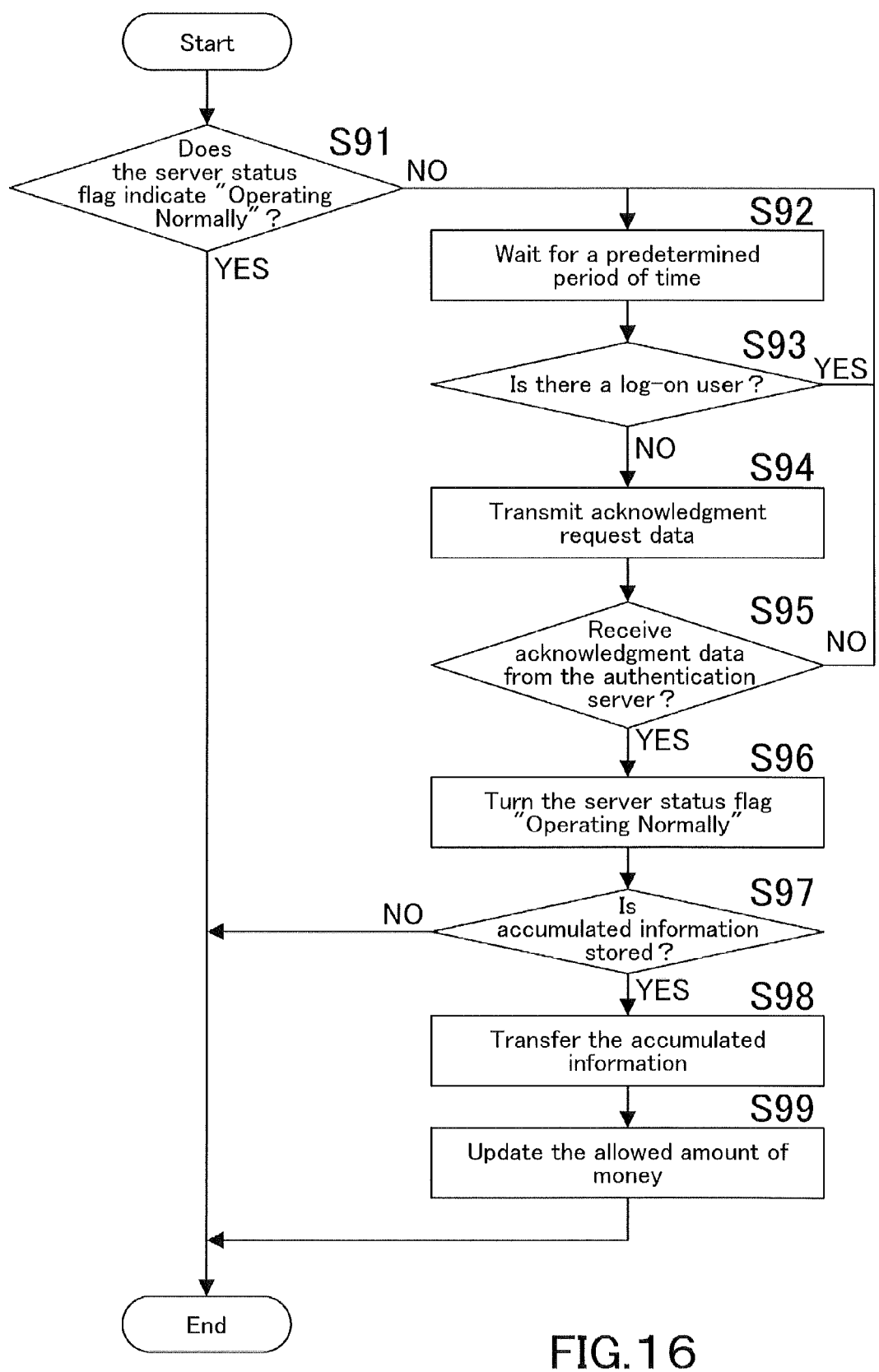

FIG. 16 is a flowchart representing an operation of the MFP 1, which is suspending the operation as described above.

In Step S91, the MFP 1 judges whether or not the server status flag indicates "Operating Normally". If it indicates "Operating Normally" (YES in Step S91), the flowchart terminates to continue to the above-mentioned flowchart of FIG. 7 for the case in which the authentication server 2 is operating normally. If it does not indicate "Operating Normally" (NO in Step S91), the flowcharts waits for a predetermined period of time in Step S92; after a predetermined period of time, the MFP 1 judges whether or not there is a log-on user in Step S93. If there is a log-on user (YES in Step S93), the MFP 1 does not check the server status, then the flowchart returns to Step S92 to wait for another predetermined period of time.

If there is not a log-on user (NO in Step S93), the MFP 1 transmits acknowledgment request data to the authentication server 2 in Step S94. Then the flowchart proceeds to Step S95.

In Step S95, the MFP 1 judges whether or not acknowledgment data is received from the authentication server 2 within a certain period of time in response to the acknowledgment request data. If it is not received (NO in Step S95), the flowchart returns to Step S92.

If acknowledgment data is received (YES in Step S95), the MFP 1 turns the server status flag "Operating Normally" in Step S96, and judges whether or not accumulated information is stored in Step S97.

If accumulated information is not stored (NO in Step S97), the flowchart terminates to continue to the above-mentioned flowchart of FIG. 7 for the case in which the authentication server 2 is operating normally. If accumulated information is stored (YES in Step S97), the MFP 1 transfers the accumulated information to the authentication server 2 in Step S98, and updates the allowed amount of money in Step S99. Then the flowchart terminates to continue to the above-mentioned flowchart of FIG. 7 for the case in which the authentication server 2 is operating normally.

In the above-mentioned embodiment, users specify the time to check if the authentication server 2 recovers from down status so that the MFP 1 can check the status of the server status at the specified time. Alternatively, the MFP 1 specifies the time to check the server status on the basis of the number of users and other information as described below.

Figure 17:
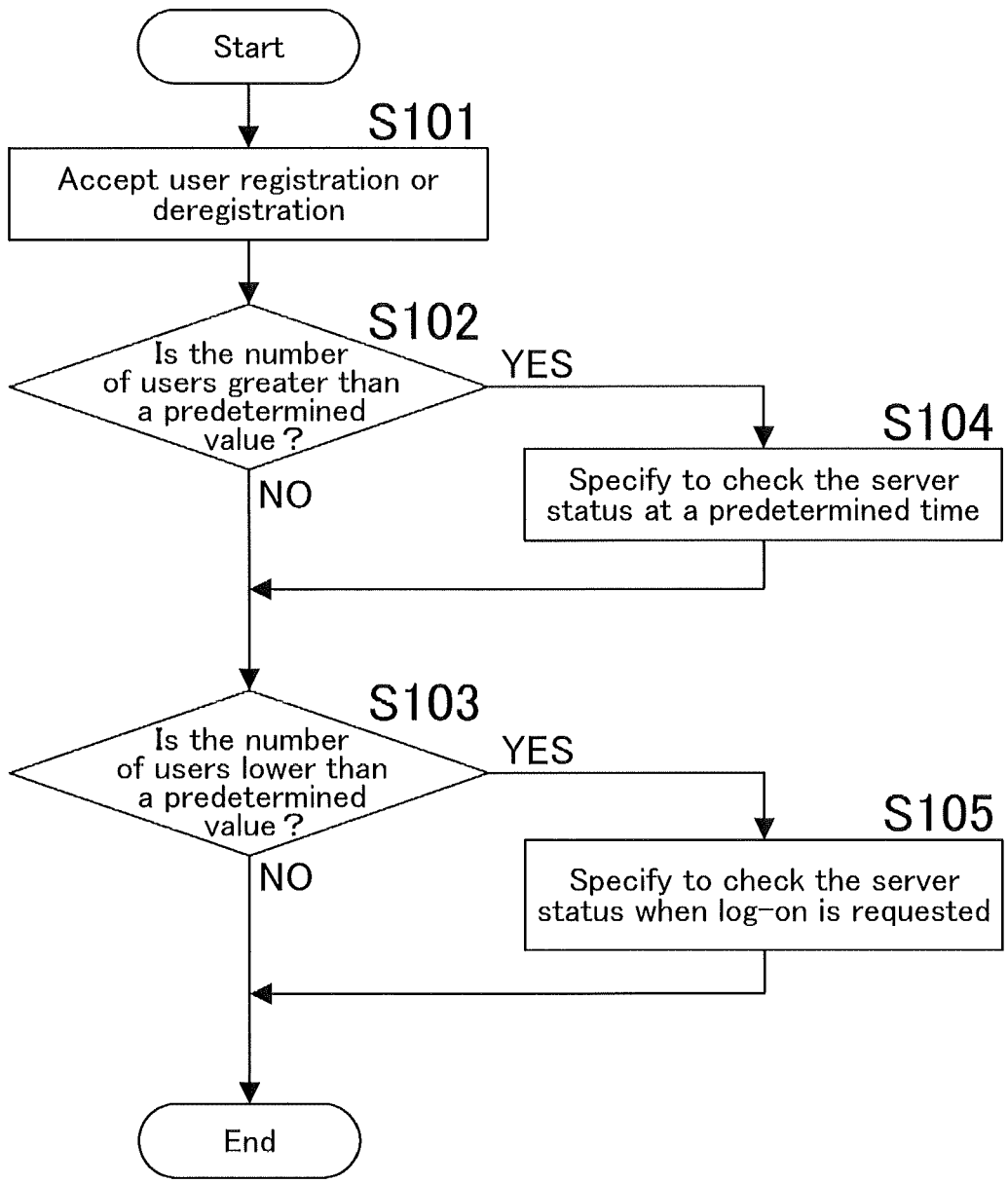
FIG. 17 is a flowchart representing an operation of the image processing apparatus, which is specifying the time to check the status of the authentication server, when a user is registered or deregistered.

FIG. 17 is a flowchart representing an operation of the MFP 1, which is specifying the time to check the server status, when a user is registered or deregistered.

In Step S101, the MFP 1 accepts user registration or deregistration. Then the MFP 1 judges whether or not the number of users is greater than a predetermined value in Step S102. If it is greater than a predetermined value (YES in Step S102), the MFP 1 specifies to perform status monitoring by checking the server status at a predetermined time in Step S104. Then the flowchart proceeds to Step S103. In Step S102, if the number of users is not greater than a predetermined value (NO in Step S102), the flowchart proceeds to Step S103.

In Step S103, the MFP 1 judges whether or not the number of users is less than a predetermined value. If it is less than a predetermined value (YES in Step S103), the MFP 1 specifies to perform status monitoring by checking the server status when log-on is requested in Step S105. Then the flowchart terminates. In Step S103, if the number of users is not less than a predetermined value (NO in Step S103), the flowchart terminates.

As described above, under the circumstances in which the number of users is greater than a predetermined value, if status monitoring is performed when log-on is requested, status monitoring would interfere with log-on processing, resulting in making other users wait. The problem can be solved by checking the server status at a predetermined time. In contrast, under the circumstances in which the number of users is less than a predetermined value, even if status monitoring is performed when log-on is requested, status monitoring would not interfere with log-on processing so seriously, resulting in only a little inconvenience. In order to detect earlier that the authentication server 2 recovers, the MFP 1 performs status monitoring by checking the server status when log-on is requested.

"User registration" herein also means: registering a user on the MFP 2; and storing an authorized user on the authentication results memory 162 after a user is logged on to the authentication server 2. The predetermined value compared to the number of users may be factory default values of the MFP 1; users do not need necessarily to change the factory default values but can change them manually depending on the pattern of use of the MFP 1. The respective predetermined values compared to the number of users in the judgments of Steps S102 and S103 may be identical or different.

As for the time to check the server status, a time specified in the flowchart of FIG. 17 may compete with another time having been specified previously. The problem can be solved by giving priority to either of the competing times, overwriting the previously specified time with the lately specified time, or overriding the lately specified time.

Figure 18:
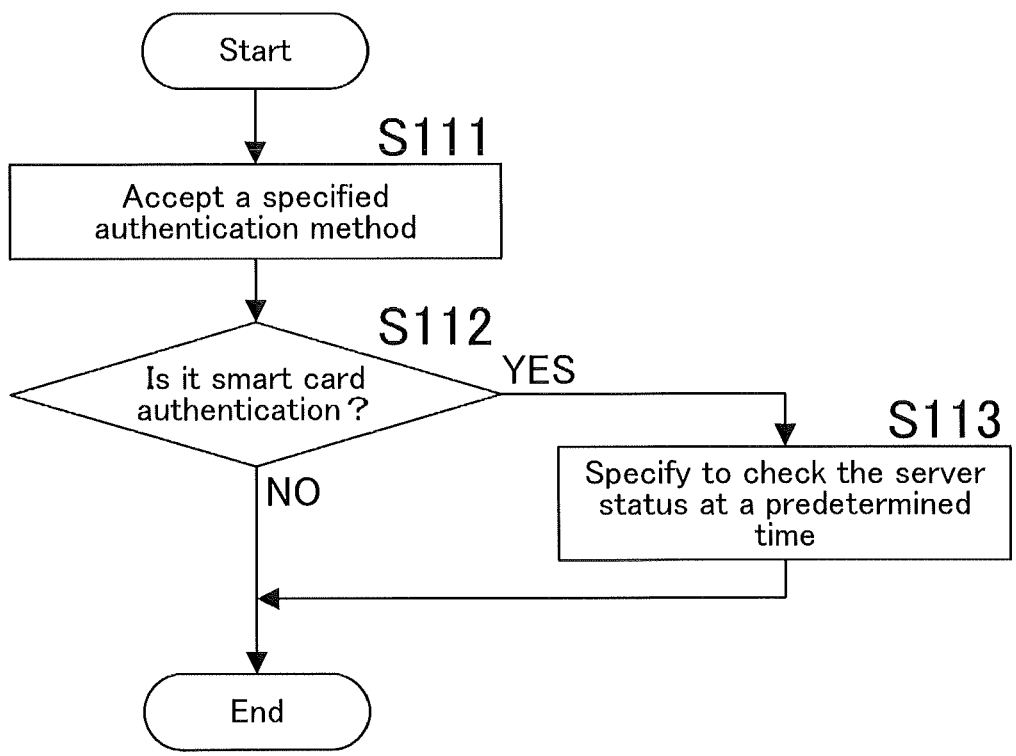
FIG. 18 is a flowchart representing an operation of the image processing apparatus, which is specifying the time to check the status of the authentication server, if user information input by a user for user authentication is scanned smart card information.

FIG. 18 is a flowchart representing an operation of the MFP 1, which is specifying the time to check the status of the authentication server, if user information input by a user for user authentication is scanned smart card information.

In Step S111, the MFP 1 accepts a specified authentication method. Then the MFP 1 judges whether or not it is smart card authentication in Step S112. Users specify an authentication method from an input portion of the MFP 1 or by operating information processing apparatuses such as personal computers, tablet computer terminals, and smartphones, having a communication portion to perform communication with the MFP 1. Alternatively users specify an authentication method by operating the authentication server 2 then the MFP 1 obtains the settings from the authentication server 2.

If it is smart card authentication (YES in Step S112), the MFP 1 specifies to perform status monitoring by checking the server status at a predetermined time in Step S113. Then the flowchart terminates. If it is not smart card authentication (NO in Step S112), the flowchart terminates immediately.

If it is smart card authentication, more users would prefer using the MFP 1 for the convenience. By checking if the authentication server 2 recovers from down status, at a predetermined time, it is prevented that log-on processing takes time due to status monitoring.

As for the time to check the server status, a time specified in the flowchart of FIG. 18 may compete with another time having been specified previously. The problem can be solved by giving priority to either of the competing times, overwriting the previously specified time with the lately specified time, or overriding the lately specified time.

Figure 19:
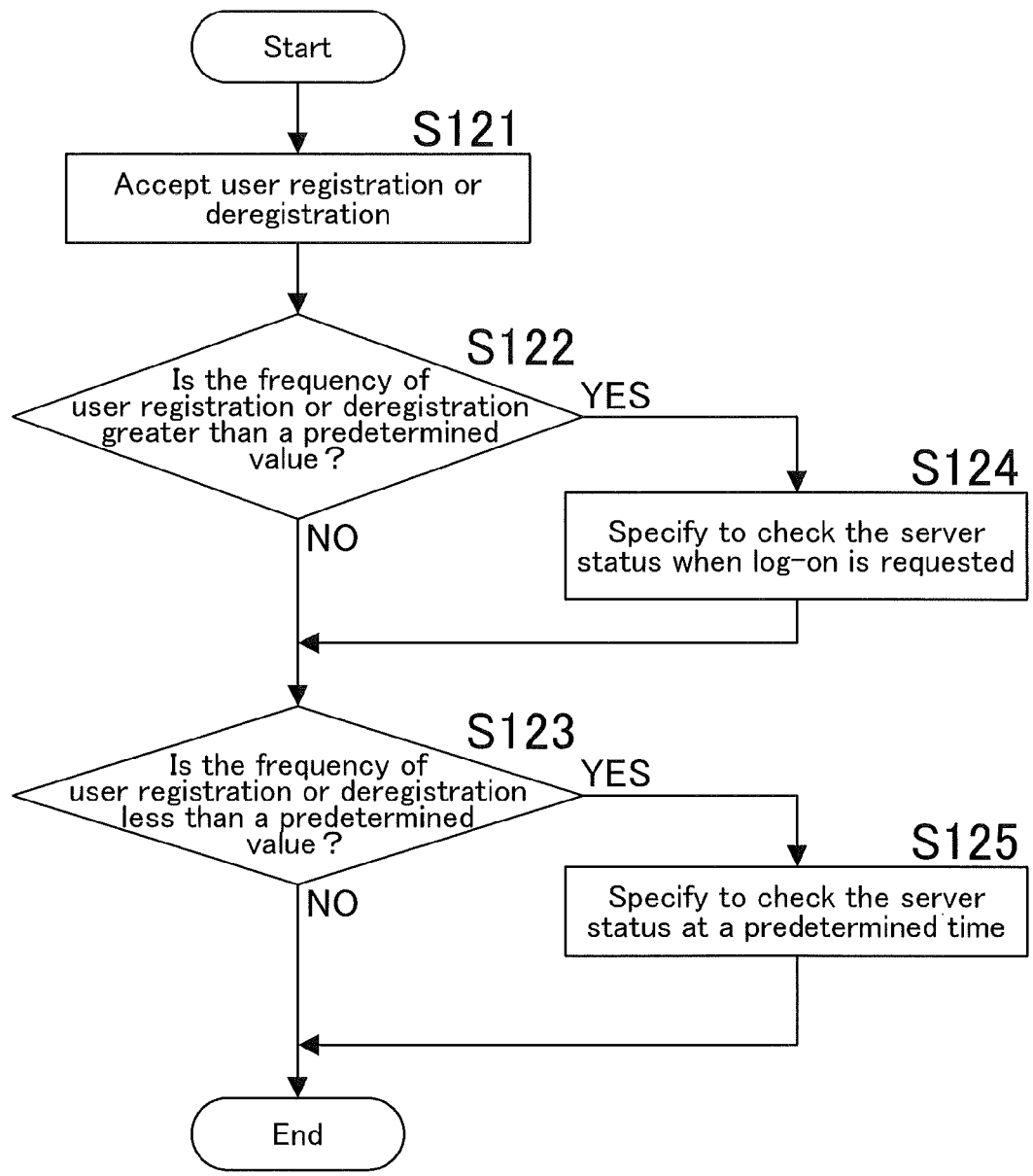
FIG. 19 is a flowchart representing an operation of the image processing apparatus, which is specifying the time to check the status of the authentication server, on the basis of the frequency of user registration or deregistration.

FIG. 19 is a flowchart representing an operation of the MFP 1, which is specifying the time to check the server status, according to whether users are registered or deregistered frequently.

In Step S121, the MFP 1 accepts user registration or deregistration. Then in Step S122, the MFP 1 judges whether or not the frequency of user registration or deregistration is greater than a predetermined value, i.e., users are registered or deregistered frequently. If it is greater than a predetermined value (YES in Step S122), the MFP 1 specifies to perform status monitoring by checking the server status when log-on is requested in Step S124. Then the flowchart proceeds to Step S213. In Step S122, if the frequency of user registration or deregistration is not greater than a predetermined value (NO in Step S122), the flowchart proceeds to Step S123.

In Step S123, the MFP 1 judges whether or not the frequency of user registration or deregistration is less than a predetermined value. If it is less than a predetermined value (YES in Step S123), the MFP 1 specifies to perform status monitoring by checking the server status at a predetermined time in Step S125. Then the flowchart terminates. In Step S123, if it is not less than a predetermined value (NO in Step S123), the flowchart terminates.

Under the circumstances in which users are registered or deregistered frequently, the latest user registration or deregistration may not be effective yet on the MFP 1. By checking the server status when log-on is requested, the MFP 1 can detect the latest user registration or deregistration earlier, resulting in accepting earlier users who have just been registered and rejecting earlier users who have just been deregistered. In contrast, under the circumstances in which users are not registered or deregistered frequently, the MFP 1 needs to check the server status at a predetermined time, resulting in preventing log-on processing takes time.

The predetermined value compared to the frequency of user registration or deregistration may be factory default values of the MFP 1; users do not need necessarily to change the factory default values but can change them manually depending on the pattern of use of the MFP 1. "User registration or deregistration" herein also means: registering a user on the MFP 2; storing an authorized user on the authentication results memory 162 after a user is logged on to the authentication server 2; deregistering a user by the MFP 1; and deregistering a user by the authentication server 2. The respective predetermined values compared to the frequency of user registration or deregistration in the judgments of Steps S122 and S123 may be identical or different.

As for the time to check the server status, a time specified in the flowchart of FIG. 19 may compete with another time having been specified previously. The problem can be solved by giving priority to either of the competing times, overwriting the previously specified time with the lately specified time, or overriding the lately specified time.

In the flowchart of FIG. 19, the frequency by which users are registered or deregistered on the MFP 1 is used. Instead, the MFP 1 may specify the time to check the server status, on the basis of the frequency by which users are registered or deregistered on the authentication server 2. In such a case, the operation of the MFP 1 is also represented by the flowchart of FIG. 19; it should be understood that in Step S121 a user is registered or deregistered on the authentication server 2, not the MFP 1.

Figure 20:
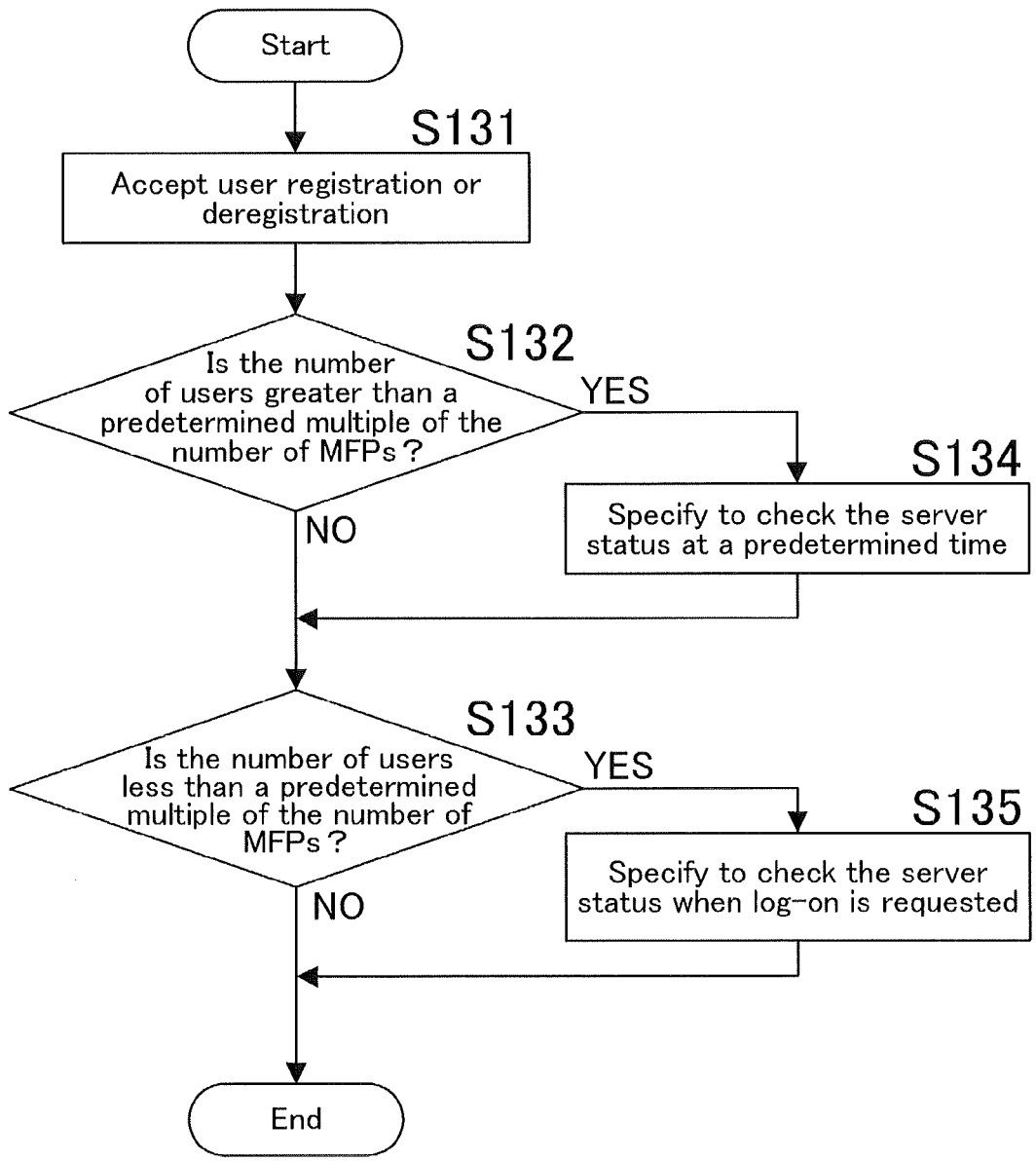
FIG. 20 is a flowchart representing an operation of the image processing apparatus, which is specifying the time to check the status of the authentication server, on the basis of the number of users and the number of the image processing apparatuses, when a user is registered or deregistered.

FIG. 20 is a flowchart representing an operation of the MFP 1, which is specifying the time to check the server status, on the basis of the number of users and the number of the MFPs 1, when a user is registered or deregistered.

In Step S131, the MFP 1 accepts user registration or deregistration. Then the MFP 1 judges whether or not the number of users is greater than a predetermined multiple of the number of the MFPs 1 in Step S132. If it is greater than a predetermined multiple of the number of the MFPs 1 (YES in Step S132), the MFP 1 specifies to perform status monitoring by checking the server status at a predetermined time in Step S134. Then the flowchart proceeds to Step S133. In Step S132, if the number of users is not greater than a predetermined multiple of the number of the MFPs 1 (NO in Step S132), the flowchart proceeds to Step S133.

In Step S133, the MFP 1 judges whether or not the number of users is less than a predetermined multiple of the number of the MFPs 1. If it is less than a predetermined multiple of the number of the MFPs 1 (YES in Step S133), the MFP 1 specifies to perform status monitoring by checking the server status when log-on is requested in Step 135. Then the flowchart terminates. In Step S133, if the number of users is not less than a predetermined multiple of the number of the MFPs 1 (NO in Step S133), the flowchart terminates.

As described above, under the circumstances in which the number of users is greater than a predetermined multiple of the number of the MFPs 1, i.e., many users use one MFP 1, if status monitoring is performed when log-on is requested, status monitoring would interfere with log-on processing, resulting in making other users wait. The problem can be solved by checking the server status at a predetermined time. In contrast, under the circumstances in which the number of users is less than a predetermined multiple of the number of the MFPs 1, even if status monitoring is performed when log-on is requested, status monitoring would not interfere with log-on processing so seriously, resulting in only a little inconvenience. In order to detect earlier that the authentication server 2, the MFP 1 performs status monitoring by checking the server status when log-on is requested.

The predetermined multiples of the number of the MFPs 1, compared to the number of users may be factory default values of the MFP 1; users can change them manually depending on the pattern of use of the MFP 1, but it is not necessary.

As for the time to check the server status, a time specified in the flowchart of FIG. 20 may compete with another time having been specified previously. The problem can be solved by giving priority to either of the competing times, overwriting the previously specified time with the lately specified time, or overriding the lately specified time.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
    a transmitter that transmits user information to an authentication server, the user information being input by a user when log-on is requested;
    a receiver that receives an authentication result from the authentication server, the authentication result being obtained by the authentication server on the basis of the user information;
    a job execution portion that executes a job as instructed by the user if the authentication result proves that the user is successfully identified as an authorized user;
    a register storage that stores accumulated information including information about the job executed by the job execution portion;
    an information transfer portion that transfers the accumulated information to the authentication server, the accumulated information being stored on the register storage;
    a detector that detects an event if the authentication server is down;
    a time settings portion that specifies either "at a predetermined time" or "when log-on is requested", as the time to check the status of the authentication server, after the detector detects that event; and
    a status checking portion that: transmits acknowledgment request data to the authentication server at the time specified by the time settings portion; and checks the status of the authentication server if acknowledgment data is received from the authentication server in response to the acknowledgment request data;
    wherein the time settings portion specifies "at a predetermined time" if a number of users registered on a memory is greater than a first predetermined value, and the time setting portion specifies "when log-in is requested" if the number of users registered on the memory is less than a second predetermined value.

2. The image processing apparatus as recited in claim 1, wherein the status checking portion further checks the status of the authentication server either when log-out is requested or when job execution finishes or both when log-out is requested and when job execution finishes, if "when log-on is requested" is specified by the time settings portion.

3. The image processing apparatus as recited in claim 1, wherein the status checking portion suspends the operation of checking the status of the authentication server at a predetermined time, while there is a log-on user, even if "at a predetermined time" is specified by the time settings portion.

4. The image processing apparatus as recited in claim 1, wherein
    the memory is located in the image processing apparatus.

5. The image processing apparatus as recited in claim 4, wherein
    the user information is stored on the memory; and
    user authentication is conducted on the basis of the user information stored on the memory if the authentication server is down.

6. The image processing apparatus as recited in claim 1, wherein
    the memory is provided in the authentication server; and
    the first predetermined value is a first predetermined multiple of a number of image processing apparatuses registered on the authentication server and the second predetermined value is a second predetermined multiple of the number of image processing apparatuses registered on the authentication server.

7. An authentication system comprising: an authentication server and the image processing apparatus as recited in claim 1, the authentication server and the image processing apparatus being capable of accessing each other,
    the authentication server comprising:
    a receiver that receives user information from the image processing apparatus, the user information being input to the image processing apparatus by a user when log-on is requested;
    a register storage that stores user information of a plurality of users for user authentication;
    an authentication portion that performs user authentication by comparing the user information received from the image processing apparatus to the user information stored on the register storage; and
    a transmitter that transmits an authentication result to the image processing apparatus, the authentication result being obtained by the authentication portion.

8. A method of performing status monitoring to check if an authentication server recovers from down status, the method to be implemented by an authentication system, the authentication system comprising: an authentication server and an image processing apparatus, the authentication server and the image processing apparatus being capable of accessing each other, the authentication server comprising a register storage that stores: user information of a plurality of users for user authentication; and information including allowed functions for the users on the image processing apparatus, the method comprising:

the following steps of the authentication server:
receiving user information from the image processing apparatus, the user information being input to the image processing apparatus by a user when log-on is requested;
performing user authentication by comparing the user information received from the image processing apparatus to the user information stored on the register storage; and
transmitting an authentication result to the image processing apparatus, the authentication result being obtained by user authentication; and the following steps of the image processing apparatus:
transmitting the user information to the authentication server, the user information being input by the user when log-on is requested;
receiving the authentication result from the authentication server;
executing a job as instructed by the user if the authentication result proves that the user is successfully identified as an authorized user;
storing accumulated information including information about the executed job;
transferring the accumulated information to the authentication server, the accumulated information being stored;
detecting an event if the authentication server is down;
specifying either "at a predetermined time" or "when log-on is requested", as the time to check the status of the authentication server, after that event is detected; and
transmitting acknowledgment request data to the authentication server at the selected time then checking the status of the authentication server if acknowledgment data is received from the authentication server in response to the acknowledgment request data,
wherein "at a predetermined time" is specified if a number of users registered on a memory is greater than a first predetermined value, and "when log-on is required" is specified if the number of users registered on the memory is less than a second predetermined value.

9. A non-transitory computer-readable recording medium storing a program of performing status monitoring to check if an authentication server recovers from down status, the program to make a computer of an image processing apparatus execute: transmitting user information, the user information being input by a user when log-on is requested;
receiving an authentication result from the authentication server;
executing a job as instructed by the user if the authentication result proves that the user is successfully identified as an authorized user;
storing accumulated information including information about the executed job;
transferring the accumulated information to the authentication server, the accumulated information being stored;
detecting an event if the authentication server is down;
specifying either "at a predetermined time" or "when log-on is requested", as the time to check the status of the authentication server, after that event is detected; and
transmitting acknowledgment request data to the authentication server at the selected time then checking the status of the authentication server if acknowledgment data is received from the authentication server in response to the acknowledgment request data;
wherein "at a predetermined time" is specified if a number of users registered on a memory is greater than a first predetermined value, and "when log-on is requested" is specified if the number of users registered on the memory is less than a second predetermined value.

10. The non-transitory computer-readable recording medium storing the program of performing status monitoring to check if the authentication server recovers from down status as recited in claim 9, the program to make the computer of the image processing apparatus further execute checking the status of the authentication server either when log-out is requested or when job execution finishes or both when log-out is requested and when job execution finishes, if "when log-on is requested" is specified as the time to check the status of the authentication server.

11. The non-transitory computer-readable recording medium storing the program of performing status monitoring to check if the authentication server recovers from down status as recited in claim 9, the program to make the computer of the image processing apparatus further execute suspending the operation of checking the status of the authentication server at a predetermined time, while a user is logged on, even if "at a predetermined time" is specified.

12. The non-transitory computer-readable recording medium storing the program of performing status monitoring to check if the authentication server recovers from down status as recited in claim 9, wherein the memory is located in the image processing apparatus.

13. The non-transitory computer-readable recording medium storing the program of performing status monitoring to check if the authentication recovers from down status as recited in claim 12, wherein the user information is stored in the memory, and the program makes the computer of the image processing apparatus further execute conducting user authentication on the basis of the user information stored on the memory if the authentication server is down.

14. The non-transitory computer-readable recording medium storing the program of performing status monitoring to check if the authentication server recovers from down status as recited in claim 9, wherein
the memory is located in the authentication server, and
the first predetermined value is a first predetermined multiple of a number of image processing apparatuses registered on the authentication server and the second predetermined value is a second predetermined multiple of the number of image processing apparatuses registered on the authentication server.

15. An image processing apparatus comprising:
a transmitter that transmit user information to an authentication server, the user information being input by a user when log-on is required;
a receiver that receives an authentication result from the authentication server, the authentication result being obtained by the authentication server on the basis of the user information;
a job execution portion that executes a job as instructed by the user if the authentication result proves that the user is successfully identified as an authorized user;
a register storage that stores accumulated information including information about the job executed by the job execution portion;
an information transfer portion that transfers the accumulated information to the authentication server, the accumulated information being stored on the register storage;
a detector that detects an event if the authentication server is down;
a time settings portion that specifies either "at a predetermined time" or "when log-on is requested", as the time to check the status of the authentication server, after the detector detects that event; and a status checking portion that: transmits acknowledgment request data to the authentication server at the time specified by the time settings portion; and checks the status of the authentication server if acknowledgment data is received from the authentication server in response to the acknowledgment request data, wherein the time settings portion specifies "when log-on is requested" if a frequency of user registration or deregistration on a memory is greater than a first predetermined value, and the time settings portion specifies "at a predetermined time" if the frequency of user registration or deregistration on the memory is less than a second predetermined value.

16. The image processing apparatus as recited in claim 15, wherein the memory is located in the image processing apparatus.

17. The image processing apparatus as recited in claim 16, wherein:

the user information is stored on the memory; and user authentication is conducted on the basis of the user information stored on the memory if the authentication server is down.

18. The image processing apparatus as recited in claim 15, wherein the memory is located in the authentication server.

19. A non-transitory computer-readable recording medium storing a program of performing status monitoring to check if an authentication server recovers from down status, the program to make a computer of an image processing apparatus execute:

transmitting user information, the user information being input by a user when log-on is requested;

receiving an authentication result from the authentication server;

executing a job as instructed by the user if the authentication result proves that the user is successfully identified as an authorized user;

storing accumulated information including information about the executed job;

transferring the accumulated information to the authentication server, the accumulated information being stored;

detecting an event if the authentication server is down;

specifying either "at a predetermined time" or "when log-on is requested", as the time to check the status of the authentication server, after that event is detected; and transmitting acknowledgment request data to the authentication server at a selected time then checking the status of the authentication server if acknowledgment data is received from the authentication server in response to the acknowledgment request data, wherein "when log-on is requested" is specified if a frequency of user registration or deregistration on a memory is greater than a first predetermined value, and "at a predetermined time" is specified if the frequency of user registration or deregistration on the memory is less than a second predetermined value.

20. The non-transitory computer-readable recording medium storing the program of performing status monitoring to check if the authentication server recovers from down status as recited in claim 19, wherein the memory is located in the image processing apparatus.

21. The non-transitory computer-readable recording medium storing the program of performing status monitoring to check if the authentication recovers from down status as recited in claim 20, wherein the user information is stored in the memory, and the program makes the computer of the image processing apparatus further execute conducting user authentication on the basis of the user information stored on the memory if the authentication server is down.

22. The non-transitory computer-readable recording medium storing the program of performing status monitoring to check if the authentication server recovers from down status as recited in claim 19, wherein the memory is located in the authentication server.

* * * * *